Nov. 12, 1963   R. S. BISLEY   3,110,149
SIDERAKES AND LIKE IMPLEMENTS
Filed Dec. 22, 1958   17 Sheets-Sheet 12
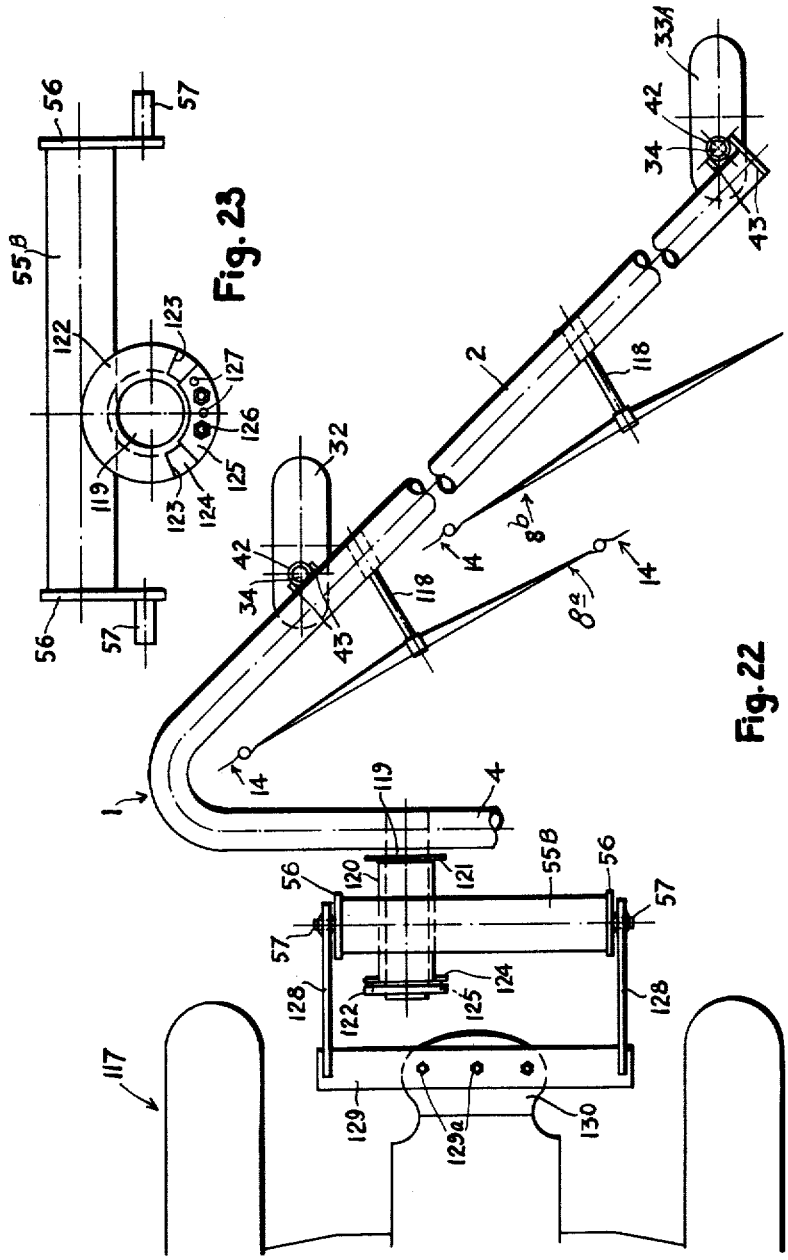
Inventor
By
Attorney

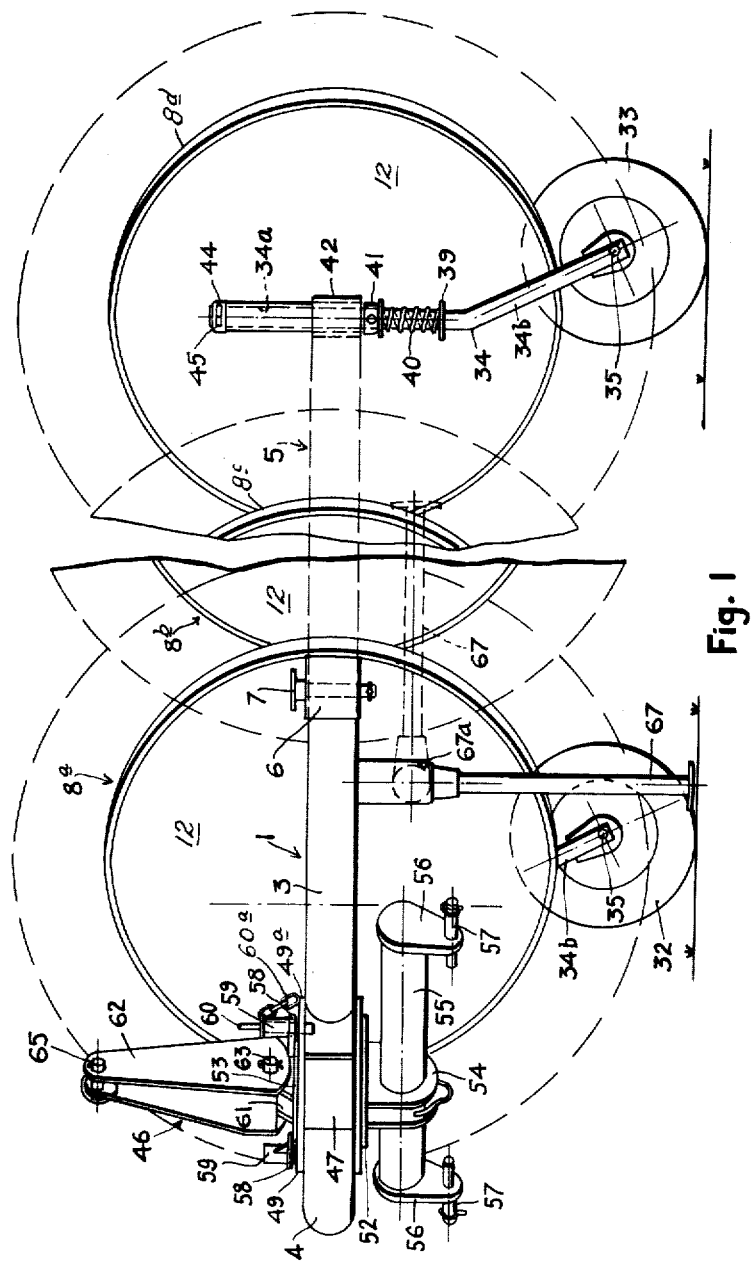

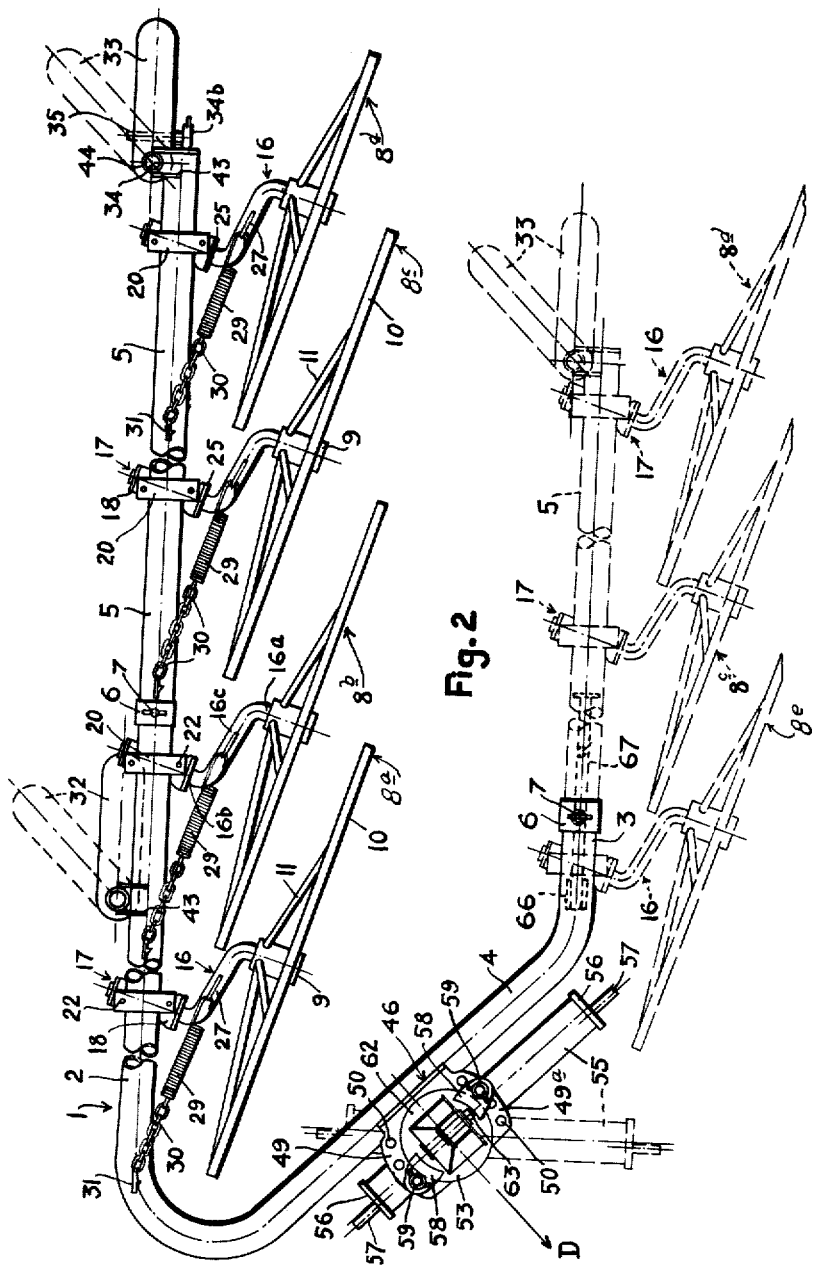

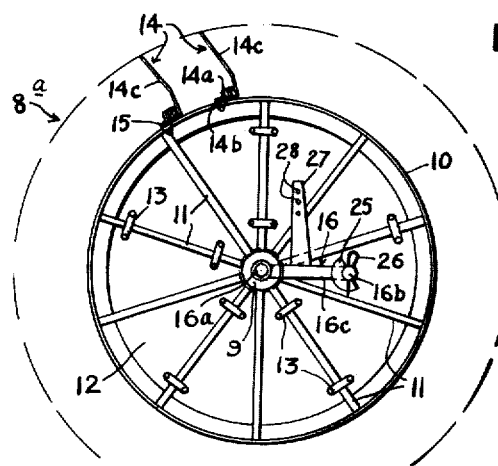
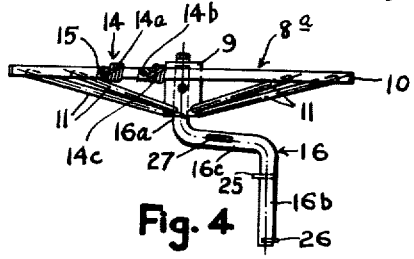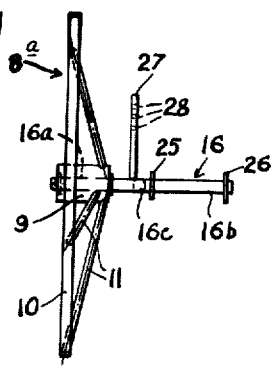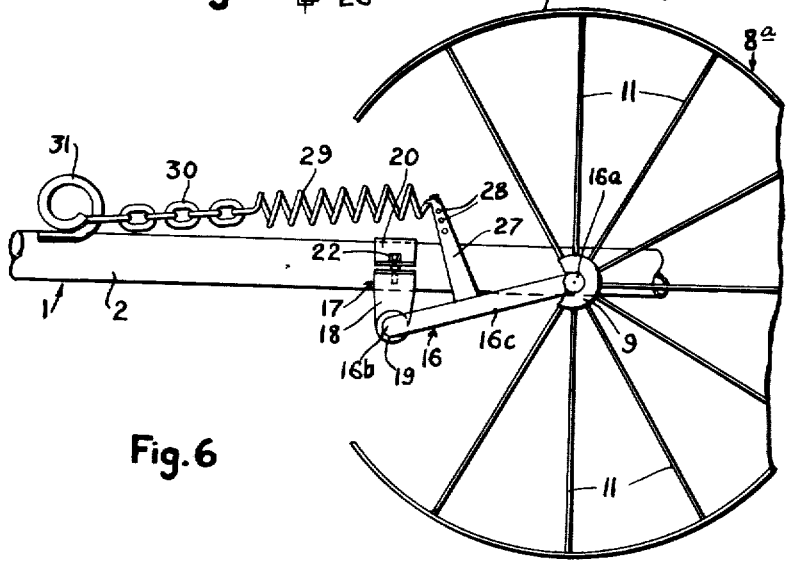

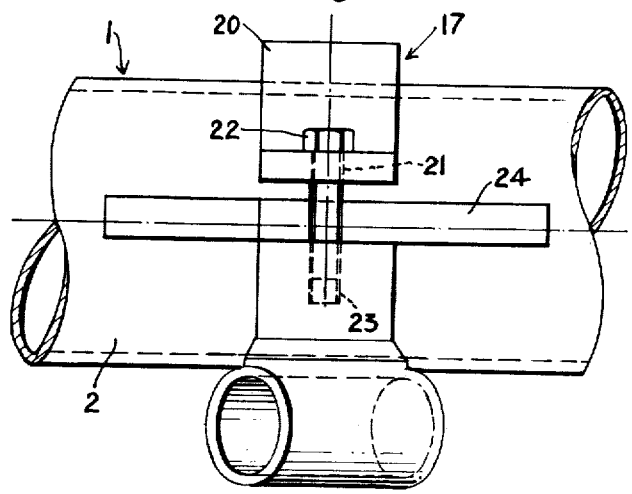
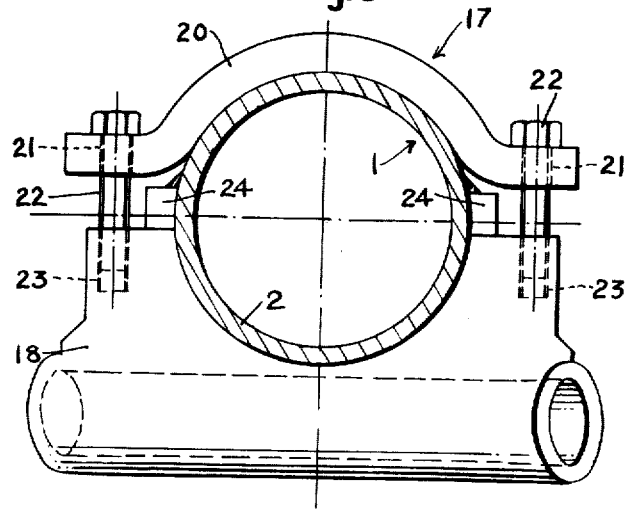

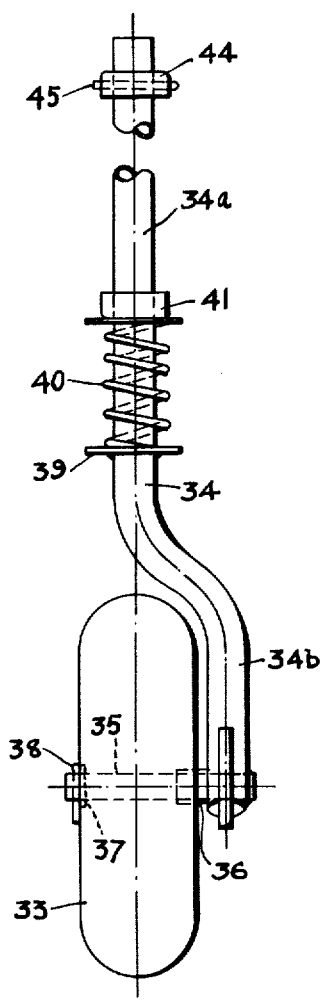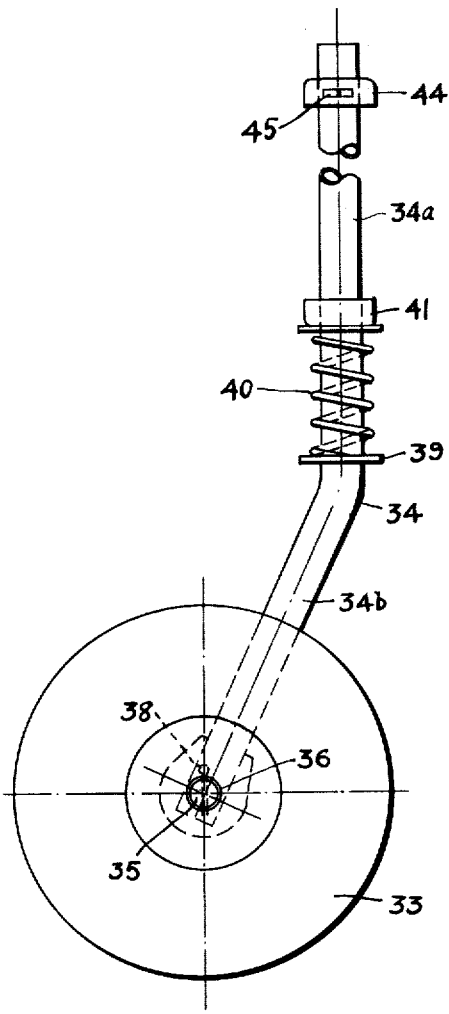

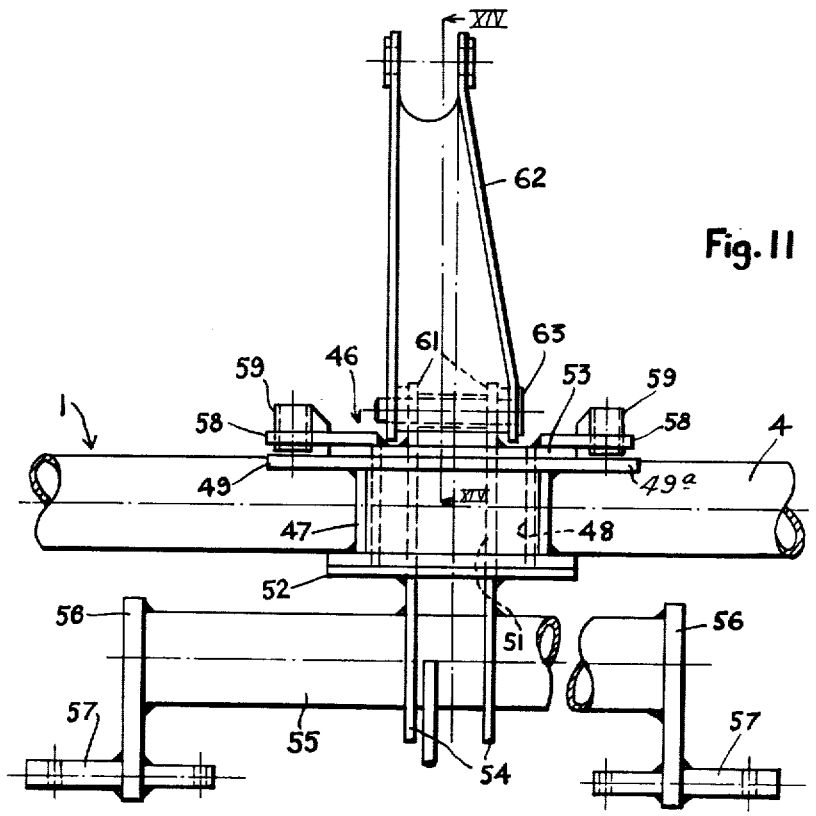
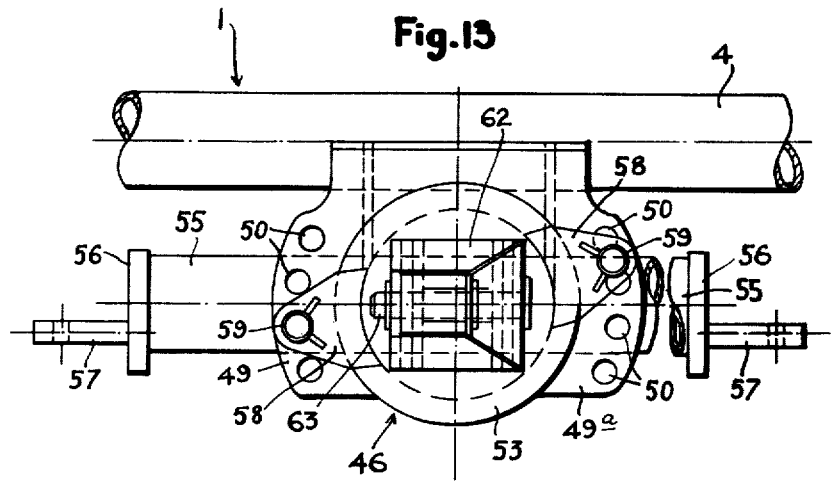

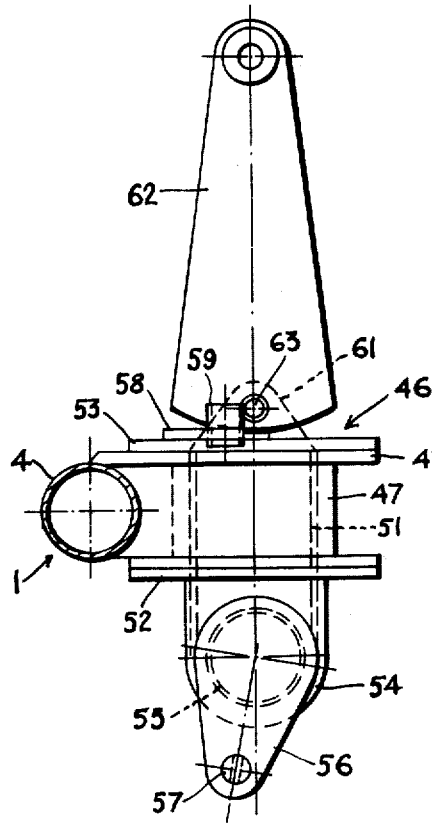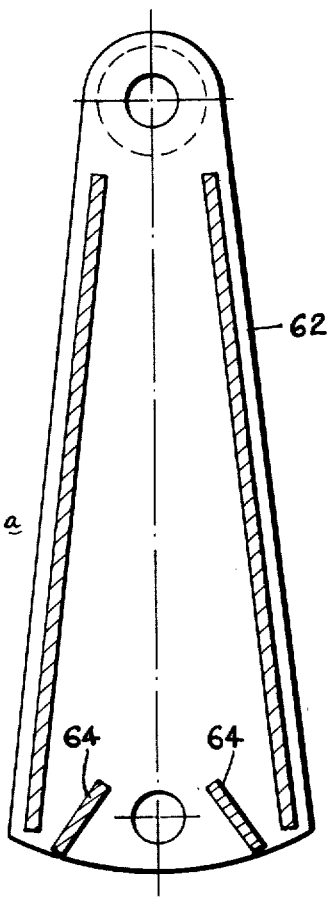

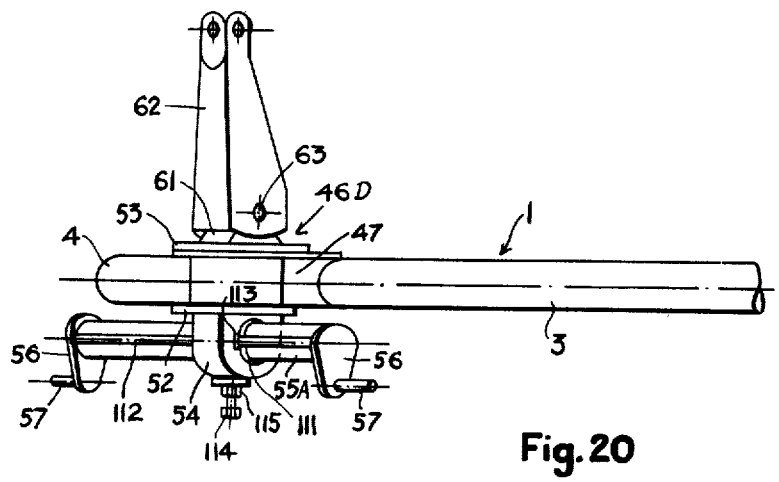
Fig. 20
Fig. 21
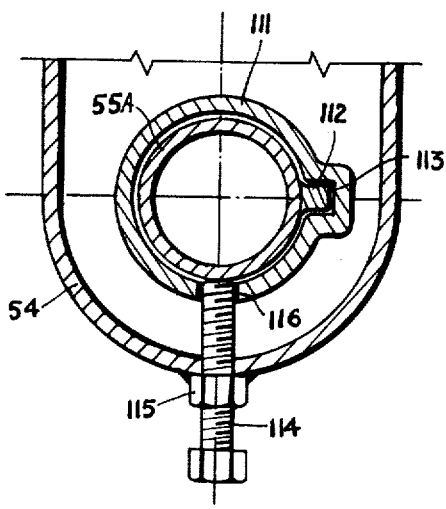

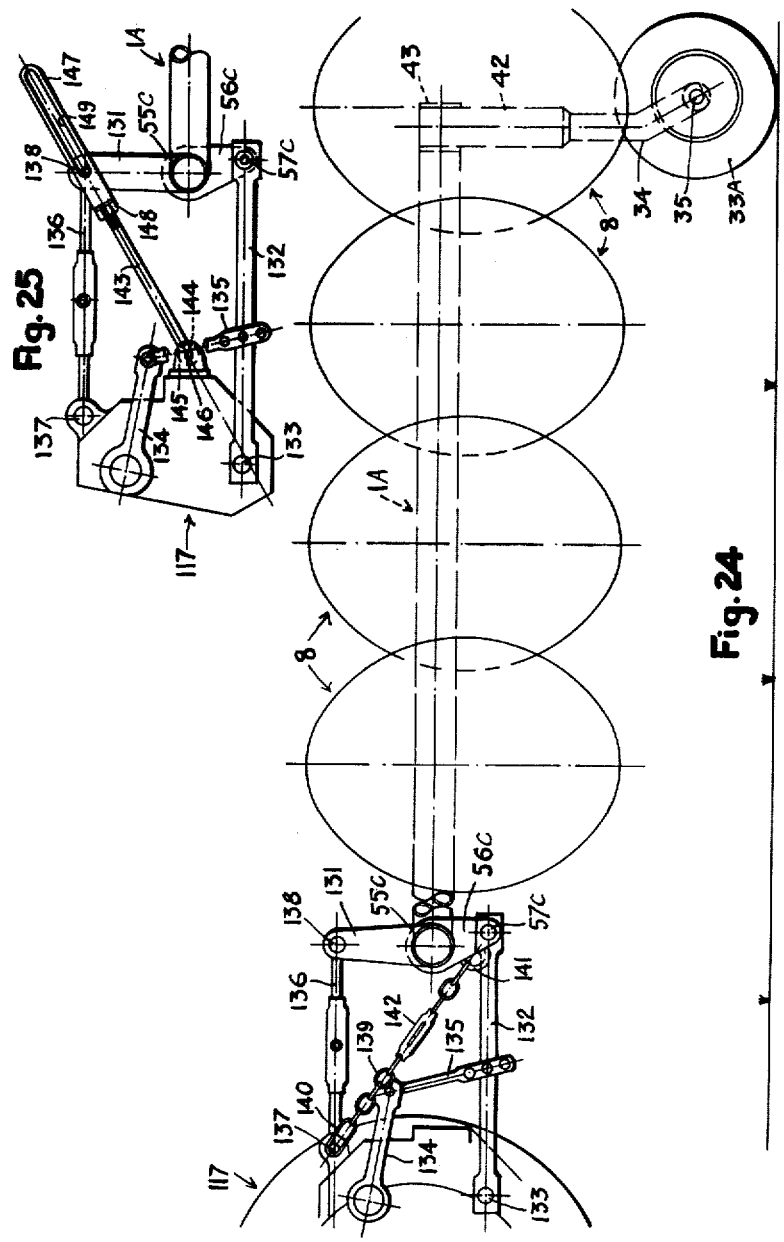

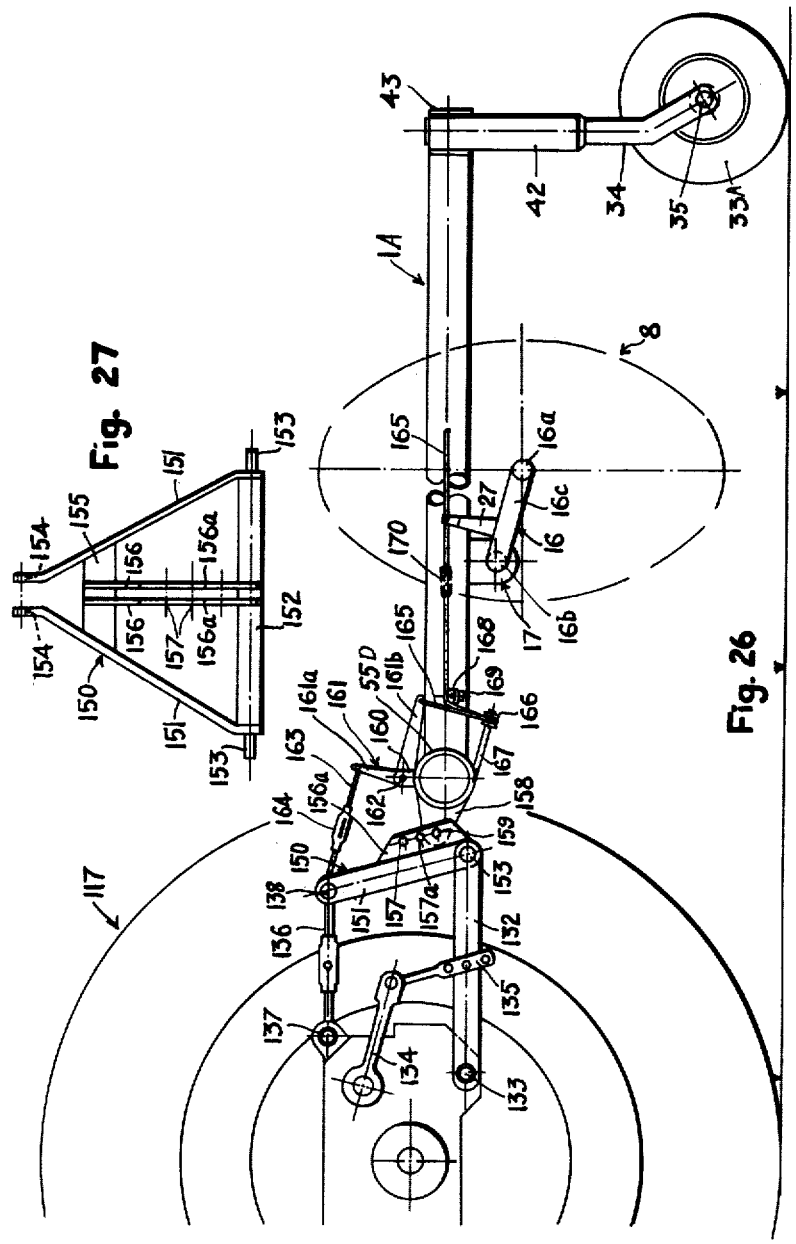

Nov. 12, 1963    R. S. BISLEY    3,110,149
SIDERAKES AND LIKE IMPLEMENTS
Filed Dec. 22, 1958    17 Sheets-Sheet 15
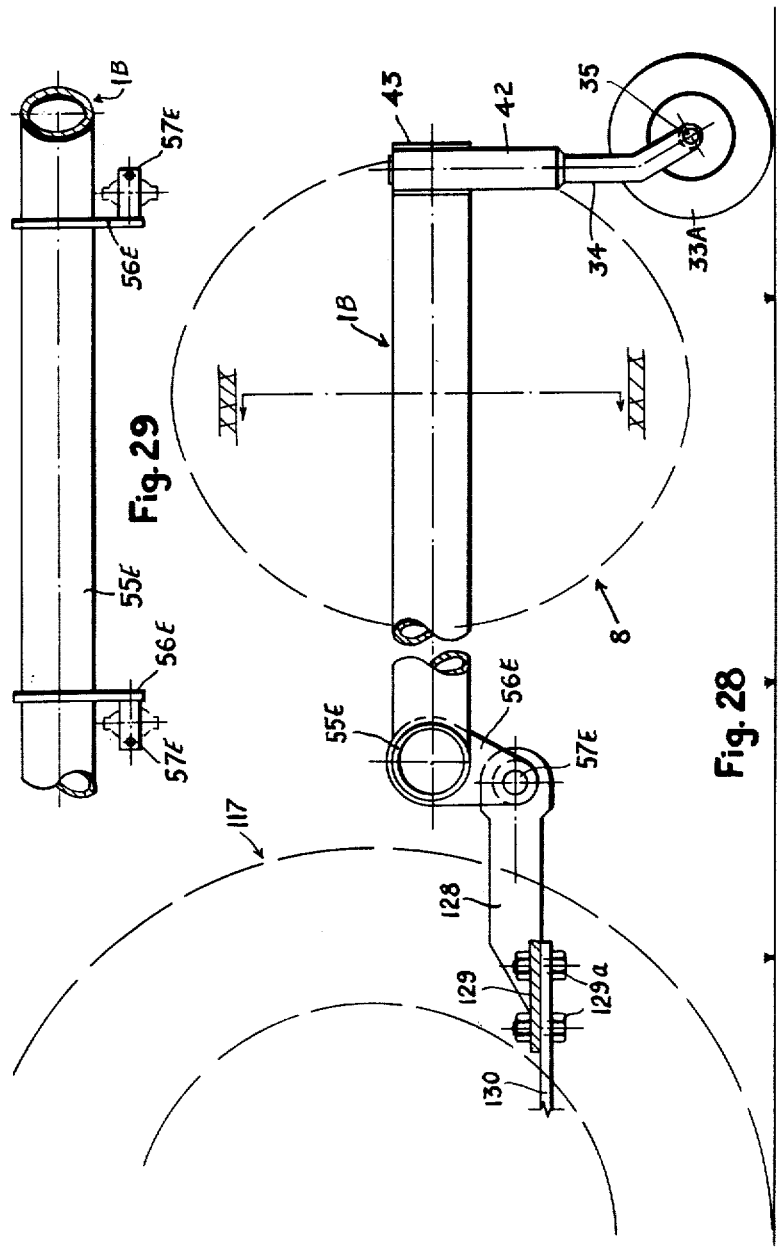

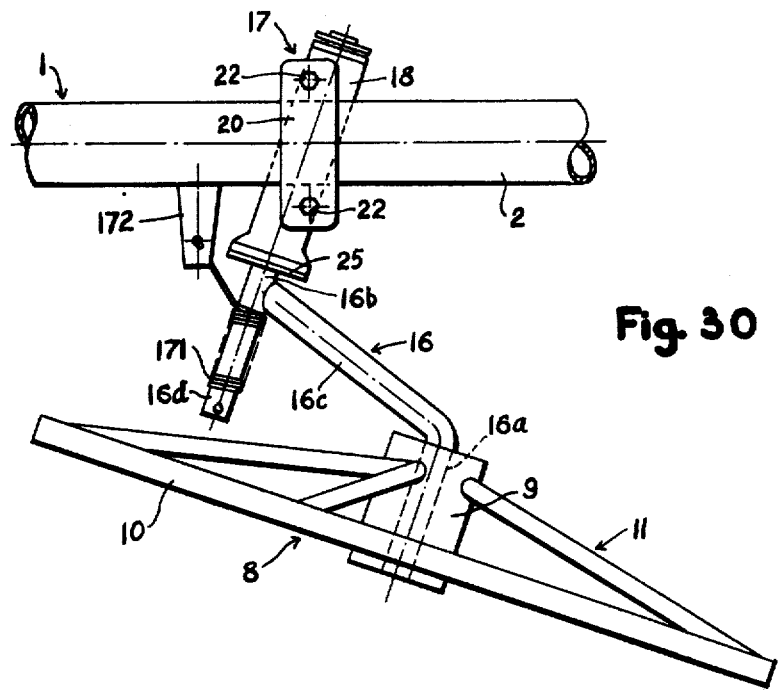
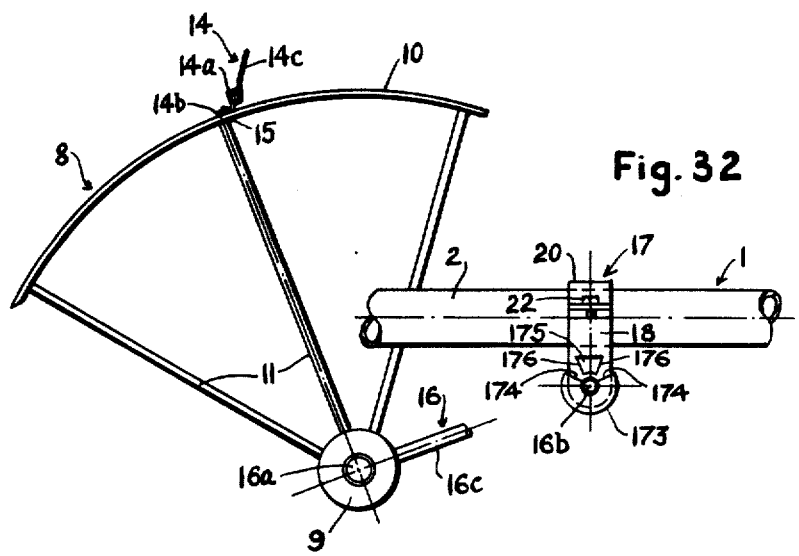

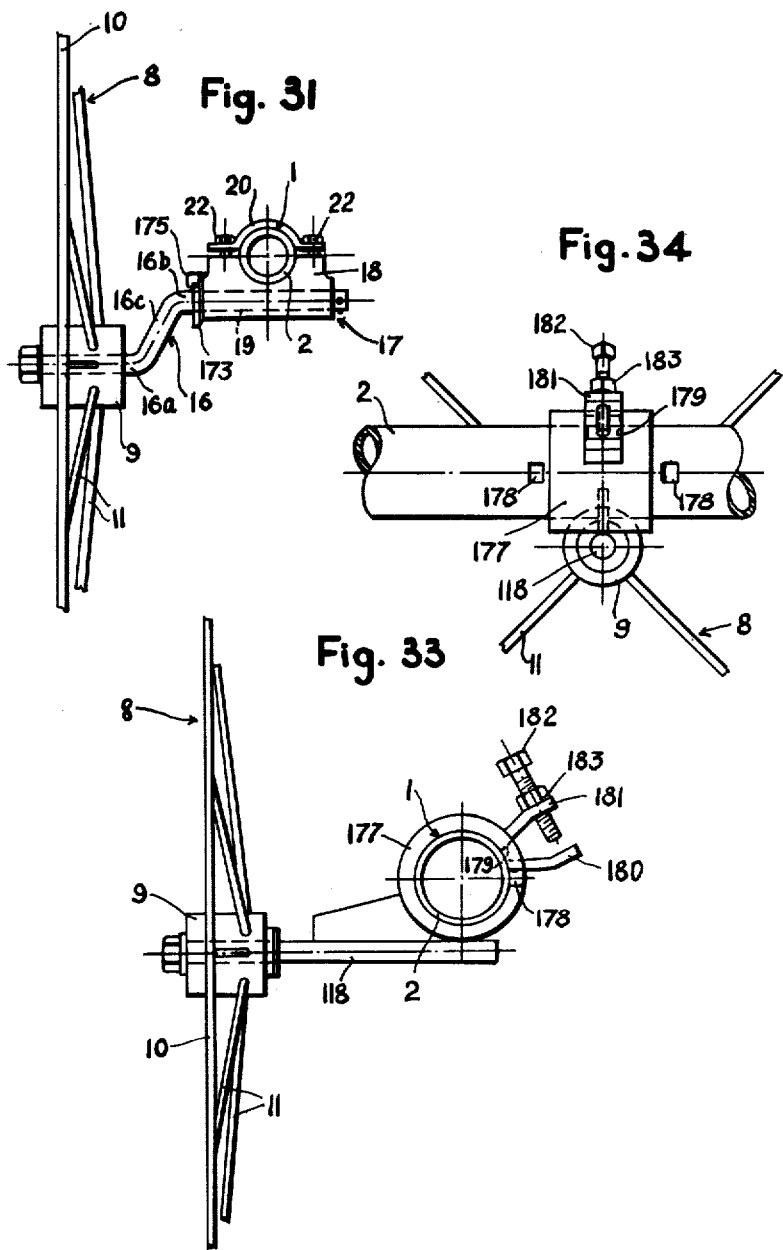

United States Patent Office 3,110,149
Patented Nov. 12, 1963

3,110,149
SIDERAKES AND LIKE IMPLEMENTS
Robin S. Bisley, Hamilton, Auckland, New Zealand, assignor to A. M. Bisley & Company Limited, Hamilton, Auckland, New Zealand
Filed Dec. 22, 1958, Ser. No. 782,075
Claims priority, application New Zealand Dec. 23, 1957
35 Claims. (Cl. 56—377)

The invention relates to siderakes and like implements of the type comprising finger-wheels adapted to be driven by contact with the crop.

One of the objects of the invention is to improve upon the construction of implements of the type stated so as to make them more simple and generally more useful and efficient than implements of the same type as hitherto constructed.

Another object of the invention is to provide ways and means enabling such implements to be converted or adapted, in a simple and very ready manner, so that they can, when desired, be used for swath turning instead of for side raking, the invention also enabling re-conversion to be carried out with equal facility. In this connection it may be mentioned that while it is known to construct implements of the type in question in such a manner that they can be used either as siderakes or as swath turners, the provisions for conversion have necessitated the use of a frame of a weight and strength substantially beyond the normal, and have otherwise resulted in an arrangement which is somewhat cumbersome and complicated. The present invention enables the advantages of convertibility to be obtained while preserving simplicity of construction.

A further object of the invention is to provide ways and means for readily adapting such implements to all makes of tractors fitted with a three-point hydraulic linkage, the geometry of which has been found to vary not only with different makes of tractors but also with different models of the same make, so that the implement when being transported, can be towed or carried in an in-line position directly behind the tractor and, when in use, can be so positioned as to be capable of operating close up to and around fences or obstacles in a field containing the crop to be treated.

A further object of the invention is to provide means which can readily be operated from the tractor seat for varying the angle of attack of the finger-wheels on the crop, to suit different widths of swath cut by different kinds of mowers, or to accommodate different operating widths, according to requirements and prevailing conditions.

A still further object of the invention is to provide for the ready substitution of one design of tines on the finger-wheels, for another design, thereby enabling the implement to be converted, at any time, from use as a hay-making type of implement for example, to use as a ground-working or weeding implement.

Still another object of the invention is to provide for the mounting of the finger wheels in such a way that, when the implement is used either as a rake or as a cultivator, it will have a more efficient action when operating on undulating ground, than has hitherto been possible.

An even further object of the invention is to provide for a three-point mounting of the implement on the tractor in such a way that while the implement is, by definition, a fully mounted machine and thus utilises the advantages of a hydraulic lift, yet will be capable, when in operation, of behaving, with respect to the contour of the ground in the same manner as a trailed implement which depends entirely on the ground for its support.

Reference is now made to the accompanying drawings, in which:

FIGURE 1 is a fragmentary side elevational view of the implement according to one particular embodiment of the invention;

FIGURE 2 is a fragmentary plan view of the device shown in FIGURE 1;

FIGURE 3 is a side elevational view on an enlarged scale of one of the finger-wheels of the implement;

FIGURE 4 is a plan view of the finger-wheel of FIGURE 3;

FIGURE 5 is an edge view of the finger-wheel of FIGURE 3;

FIGURE 6 is a view similar to that of FIGURE 3 but showing a spring connection between the finger-wheel mounting and the frame of the implement, the wheel;

FIGURE 7 is a side elevational view on an enlarged scale of a clamp forming part of the means employed for supporting each finger-wheel on the frame of the implement;

FIGURE 8 is a view taken at right-angles to FIGURE 7;

FIGURE 9 is a side elevational view on an enlarged scale of a castor wheel at the trailing end of the implement;

FIGURE 10 is an edge view of the castor wheel of FIGURE 9;

FIGURE 11 is an elevational view, on an enlarged scale, of a turntable assembly forming part of the implement and by which the implement can be connected to three-point hydraulic linkage of a tractor;

FIGURE 12 is a side elevational view of the device shown in FIGURE 11;

FIGURE 13 is a plan view of the device shown in FIGURE 11;

FIGURE 14 is an enlarged sectional view of a part of the turntable assembly taken along the line XIV—XIV in FIG. 11;

FIGURE 20 is a fragmentary side perspective view showing a refinement applicable to certain of the turntable assemblies already referred to;

FIGURE 21 is an enlarged sectional view illustrating certain details relating to FIGURE 19;

FIGURE 22 is a fragmentary plan view of the implement according to a third embodiment of the invention;

FIGURE 23 is an elevational view to an enlarged scale of part of the arrangement shown in FIGURE 22;

FIGURE 24 is a fragmentary side elevational view of the implement according to a fourth embodiment of the invention;

FIGURE 25 is a fragmentary side elevational view illustrating a modification of the arrangement shown in FIGURE 24;

FIGURE 26 is a fragmentary side elevational view of the implement according to a fifth embodiment of the invention;

FIGURE 27 is an enlarged end view illustrating part of the arrangement shown in FIGURE 26;

FIGURE 28 is a side elevational view, partly in section, of the implement according to a sixth embodiment of the invention;

FIGURE 29 is a cross-sectional view on the line XXIX—XXIX of FIGURE 28;

FIGURE 30 is a fragmentary plan view of a modified arrangement for mounting each finger-wheel on the frame of the implement;

FIGURE 31 is an edge view of another modified arrangement for mounting each finger-wheel on the frame;

FIGURE 32 is a side view of the device shown in FIGURE 31;

FIGURE 33 is an edge view of a further modified arrangement for mounting each finger-wheel on the frame, and FIGURE 34 is a fragmentary side elevational view of the device shown in FIGURE 33.

Figure 15:
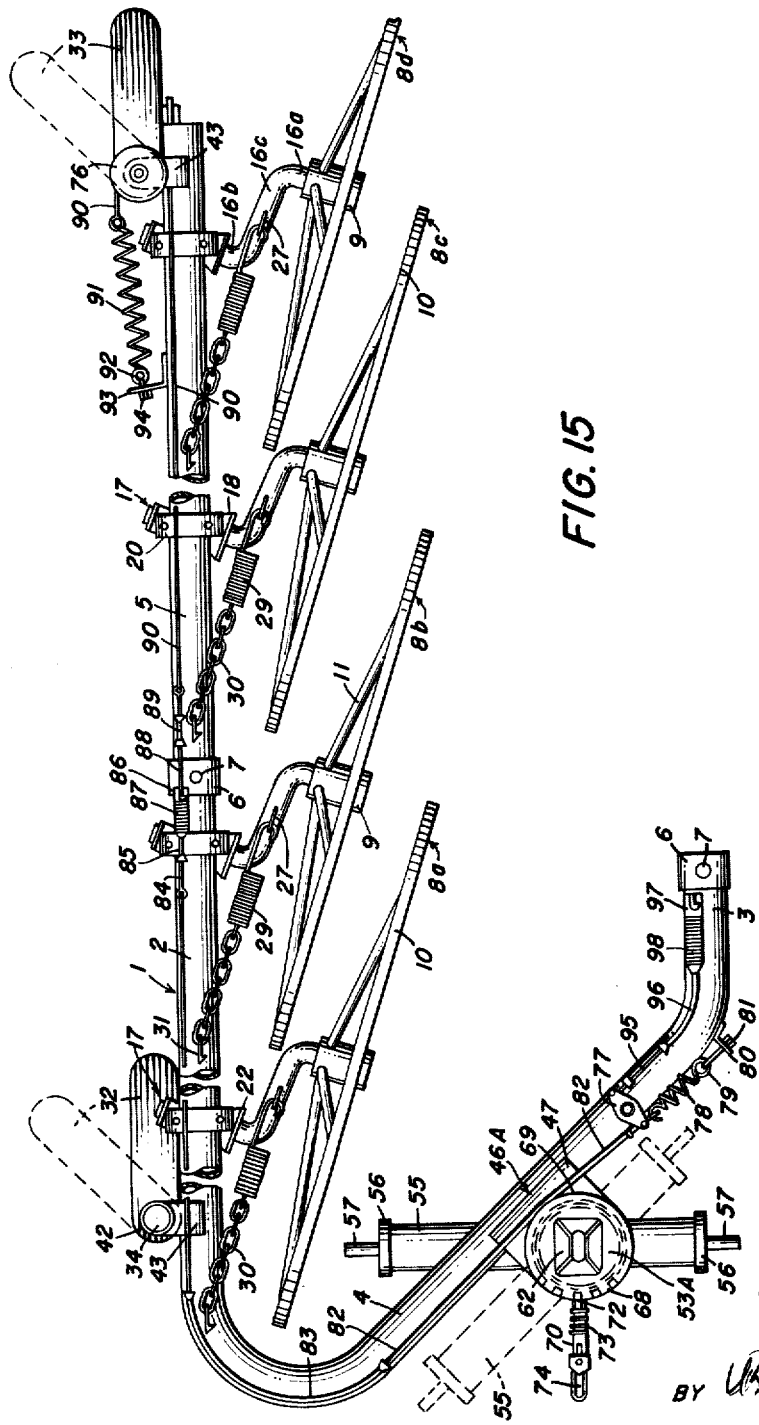
FIGURE 15 is a plan view of the implement according to another embodiment of the invention.

The implement illustrated in FIGURES 1 to 14 comprises a frame generally indicated at 1. The frame is substantially of U-shape so that it has two parallelly spaced side members 2 and 3 extending rearwardly from a crotch portion 4. The crotch portion 4 extends diagonally with respect to the side members 2 and 3 so that the corner at which the crotch portion merges into the side member 2 lies ahead of the opposite corner. The side member 2 is made of such length that it projects rearwardly to a greater extent than the side member 3, the member 2 thus being longer than the member 3.

The frame 1 includes an extension piece 5 which can be attached by its forward end and through some form of clamp or easily disconnectable type of joint, to the rear end of the side member 2 or to the rear end of the side member 3, at choice. For this purpose, and by way of example, the rear ends of the side members are fitted with sockets 6 in either one of which the forward end portion of the extension piece 5 can be engaged, the extension piece being held in position by a locking pin 7 removably engaged in registering holes in the socket and extension piece. FIGURE 2 shows, in full lines, the extension piece when attached to the side member 2 of the frame and, in broken lines, the extension piece after it has been removed from the member 2 and attached to the side member 3.

The frame 1 and extension piece 5 are of tubular steel, it thus being possible to make these parts of great strength consistent with lightness in weight.

The side member 2 of the frame 1 supports two rotatable finger-wheels 8a and 8b while the extension piece 5 supports two further rotatable finger-wheels 8c and 8d. Thus when the extension piece 5 is attached to the side member 2, all four finger-wheels lie to one side of the frame as shown in full lines in FIGURE 2, while when the extension piece is attached to the side member 3, two of the said wheels remain at the first-mentioned side of the frame, while the other two lie to the other side of the frame as shown in broken lines in the same figure. The finger-wheels 8a and 8b on the side member 2 are spaced from each other in the direction of the length of the frame 1, the same applying to the finger-wheels 8c and 8d on the extension piece 5. The several finger-wheels are arranged in echelon formation so that the trailing portion of one lies rearwardly of the leading portion of the next. The finger-wheels are, furthermore, so positioned relatively to the frame 1 that they are rotatable in planes lying at an angle to the direction of travel of the implement when it is in use, such direction being generally indicated by the arrow D in FIGURE 2.

Details relating to the construction of the finger-wheels are shown in FIGURES 3 to 5. Each wheel has a hub 9, a rim 10 and spokes 11 extending from the hub to the rim. The annular space between the hub 9 and the rim 10 is, for the most part, covered by a windshield in the form of a disc 12 (FIGURE 3) which is held in position by clips 13 engaged over some of the spokes and riveted or bolted to the disc. The rim 10 supports a plurality of resilient tines 14 spaced equally around the circumference of the wheel and projecting in a general radial direction from the rim. Each tine is made from a length of spring steel wire one end portion of which is coiled as indicated at 14a and extends from an eye 14b secured to the rim 10 by means of a bolt 15, while the other end portion projects from the coil to form a finger 14c. The inner part of the finger, that is to say, the part lying immediately next to the coil 14a, is radial, while the outer part is bent rearwardly relatively to the direction of rotation of the wheel.

Each finger-wheel 8, besides being rotatable, is mounted for independent upward and downward movement relatively to the frame 1. For simplicity, the mounting arrangement will be described with reference to those of the finger-wheels 8a and 8b that are supported from the side member 2 of the frame, the mounting arrangement for the remaining two wheels 8c and 8d that are supported from the extension piece 5 being exactly the same.

By means of its hub 9, each finger-wheel 8 is mounted for rotation on the pin 16a of a crank 16 (FIGURES 2 to 6) the shaft 16b of which is journalled for rotation in a clamp fastened to the side member 2, the clamp being generally indicated at 17. As best shown in FIGURES 7 and 8, the clamp may comprise a bearing block 18 shaped to fit against the underface of the side member 2 and formed with a horizontally extending bearing hole 19 in which the shaft 16b of the crank 16 is journalled for rotation. In conjunction with the bearing block 18 there is provided a cap 20 shaped to engage over the upper surface of the side member 2, the cap having holes 21 through which pass clamping bolts 22 engaged in screw-threaded holes 23 in the bearing block 18. Means may be provided to maintain the clamp 17 in correct angular position around the side member 2. For this purpose the side member may be provided at each side with a feather 24 extending in the direction of the length of the member 2, the two feathers acting as stops against which the bearing block 18 engages when the bolts 22 are tightened. The shaft 16b of the crank 16 is retained in the bearing hole 19 in the bearing block 18 of the clamp 17 by means of a collar 25 (FIGURES 2 to 5) secured to the shaft 16b at a distance from its free end and lying against one end of the block 18, and by means of a keeper pin 26 engaged in the projecting free end portion of the shaft 16b and lying against the opposite end of the block.

By using clamps 17 of the form described for supporting the cranks 16 of the finger-wheels 8 from the frame 1, it becomes possible to vary the positions of the finger-wheels along the frame according to requirements, the feathers 24 at the same time ensuring that the planes in which the wheels rotate will always remain the same irrespective of variations in the longitudinal setting of the clamps with respect to the frame. It will be noted from FIGURE 2 that the bearing block 18 of the clamps, and the holes 19 in which the shafts 16b of the cranks 16 are journalled, are arranged at an angle to the caps 20 when viewed in plan, the cranks thus being supported in such a manner that the wheels 8 will rotate on the crank pins 16a in planes lying not only obliquely to the direction of movement D of the implement when in operation, but also obliquely to the axis of the side member 2.

Means are provided for maintaining the finger-wheels 8 in a normal position of elevation relatively to the frame 1, while allowing them to rise and fall while the implement is in use. To this end and as shown in FIGURES 2 to 6, there is secured to the web 16c of each crank 16 an upwardly extending lever-arm 27 containing a series of holes 28 in its upper end portion, the holes being spaced from each other in the direction of the length of the lever-arm. The rear end of a forwardly extending helical tension spring 29 is hooked into a selected one of the holes 28, while the front end of the spring is hooked into the rear end link of a forwardly extending chain 30 the front end link of which is engaged with a pig's tail hook 31 secured to the side member 2 of the frame 1 (in the case of each finger-wheel 8a and 8b that is supported from the member 2), or to the extension piece 5 (in the case of each finger-wheel 8c and 8d that is supported from this piece). As best shown in FIGURES 2 and 6, the combined length of the spring 29 and chain 30, coupled with the pull exerted by the spring, is such as to maintain the crank 16 in a position in which its web 16c extends rearwardly and, as shown in FIGURE 6, is inclined to some extent upwardly from the crankshaft 16b, the crankpin 16a on which the associated finger-wheel 8 is journalled for rotation, thus being in a trailing position relatively to the direction of movement of the implement, when in use. Under these conditions, when the crank 16 rotates in a clockwise direction as viewed in FIGURE 6, the finger-wheel will move downwardly relatively to the frame, with a consequent increase in the tension of the spring 29, while when the crank rotates in an anti-clockwise direction, the wheel will move upwardly relatively to the frame, with a consequent lessening of tension in the spring. The initial setting of the wheel can be varied by disconnecting the front end link of the chain 30 from the hook 31 and engaging another link with the hook. The pulling component exerted by the spring 29 on the lever-arm 27 can also be varied by unhooking the rear end of the spring from the particular one of the holes 28 in which it is engaged, and re-hooking it in another of these holes.

The implement is provided with two ground wheels both of free castor type, one being indicated at 32 and the other at 33 in FIGURES 1 and 2. The wheel 32 is supported from the side member 2 of the frame 1, being positioned approximately midway between the front and rear ends of this member, while the wheel 33 is supported from the rear end of the extension piece. The wheel 32 thus constitutes the leading wheel, while the wheel 33 constitutes the trailing wheel.

In the illustrated form of the implement the two ground wheels are substantially identical, details of the mounting for the trailing wheel 33 being illustrated in FIGURES 9 and 10. The mounting comprises an arm 34 having an upper portion 34a extending vertically and a lower portion 34b which is inclined rearwardly as shown in FIGURES 1 and 10 and is also laterally off-set from the upper portion as shown in FIGURE 9. To the lower portion 34b there is secured a horizontally projecting axle 35 on which the wheel 33 is journalled for rotation, the wheel being correctly located and held on the axle by means of a collar 36 arranged around the inner end of the axle, and by means of a washer 37 and split pin 38 applied to the outer end of the axle. To the lower part of the portion 34a of the arm 34 there is secured a collar 39 upon which rests a helical spring 40. On the upper end of the spring there rests a collar 41 which surrounds the portion 34a of the arm with a floating fit. The part of the portion 34a of the arm 34 lying above the floating collar 41 is journalled for rotation in a bearing 42 (FIGURE 1) which rests on this collar and is secured to the rear end of the extension piece 5 by means of bracket 43. The upper end of the portion 34a of the arm 34 projects from the bearing 42 and is fitted with a collar 44 held in place by a split pin 45, the collar 44 thus acting to retain the arm in supported position. By reason of the presence of the spring 40, the mounting for the wheel 33 is resilient, thus avoiding the transmission of excessive jars and shocks to the frame 1 when the wheel runs over the ground. As the lower portion 34b of the arm 34 is inclined rearwardly, the wheel 33 has very sensitive self-steering properties, thus responding immediately to any changes in the direction of movement of the implement when drawn over the ground.

As previously indicated, the mounting for the leading ground wheel 32 is similar to that of the wheel 33. That being so, the parts of the mounting for the wheel 32, insofar as they are shown in the drawings, are indicated by the same reference numerals.

When the extension piece 5 is attached to the side member 2 of the frame 1, the ground wheels 32 and 33 will be in longitudinal alignment as shown in full lines in FIGURE 1 and will thus both be at one side of the frame. Under these conditions, and in the absence of other support beyond that given by the two wheels 32 and 33, the implement will tilt over to the opposite side to such an extent that the side member 3 will touch or lie close to the ground, while the fingers 14c of the tines 14 on the lower parts of the finger-wheels 8 will either dig into the ground or be pressed to a marked extent out of their working positions, the implement thus no longer being in a condition in which it can be used. Similarly, when the extension piece 5 is detached from the side member 2 and attached to the side member 3, the implement will, in the absence of any support beyond that given by the two ground wheels 32 and 33, tilt forwardly and towards the side having the wheel 33, the implement thus again being unfit for use in such tilted position. In short, the provision of the two ground wheels alone, these being the only ground wheels provided, is inadequate for maintenance of the frame at the correct working position above the ground, it being essential to provide some further means of support for the frame so that the implement will then be held in a position in which it is capable of being drawn over the ground in correct working position. With this factor in mind, the implement is provided with means enabling it to be connected to a towing vehicle in such manner that when the connection has been established, it will act in conjunction with the two ground wheels 32 and 33 to support the implement in correct working position.

In the embodiment now being described, the aforesaid connecting means are of such form as to enable the implement to be connected to the three-point hydraulic linkage on a tractor so that while the linkage will essentially provide the necessary extra support required, advantage can at the same time be taken of other useful attributes connected with linkage of this kind.

The connecting means referred to take the form of a turntable generally indicated at 46 in FIGURES 1, 2 and 11 to 14. The turntable comprises a socket or female member 47 secured to the front edge of the crotch portion 4 of the frame 1 approximately midway between the side members 2 and 3, the socket being formed with a vertical bearing hole 48. At its upper end, the socket 46 is formed with laterally projecting flanged portions 49 and 49a arranged diametrically opposite one another and each containing a series of vertical holes 50 spaced from each other along arcs of a circle whose centre coincides with the axis of the bearing hole 48.

A king-pin or male member 51 is journalled for rotation in the bearing hole 48 of the socket 47, the king-pin having a flange 52 bearing against the underface of the socket, and also having a circular plate 53 bearing against the upper face of the socket, the plate 53 being of such diameter as to leave exposed the holes 50 in the flanged portions 49 and 49a of the socket. A lug 54 projects downwardly from the flange 52 on the king-pin 51 and through this lug there extends a horizontally disposed drawbar 55 which is secured to the lug so that one end portion of the drawbar projects from the lug to a greater extent than the other end portion, as best shown in FIGURE 2. The ends of the drawbar 55 are provided with drop-arms 56 the lower end portions of which are provided with laterally projecting trunnion pins 57 adapted to be freely engaged in the usual eyes in the rear ends of the two bottom links of the hydraulic lift mechanism on the tractor. The trunnion pins 57 project through the drop-arms 56 so that they have inwardly projecting portions which can be engaged in the eyes on the rear ends of the two bottom links on the tractor where, in some makes of tractors, these links are arranged closer together than in other makes. It will be noted that, with the arrangement described, the axis of the trunnion pins 57 lies below the axis of the drawbar 55. It will furthermore be observed that when the turntable assembly is viewed in plan, the axis of the trunnion pins, while extending at right-angles to the axis of rotation of the king-pin 51, lies forwardly of the second-mentioned axis so that the two axes do not intersect.

The plate 53 on the king-pin 51 carries two radially projecting ears 58 lying over the flanged portions 49 and 49a of the socket 47, the ears being formed with holes continuing into upwardly projecting sleeves 59, either one of which can, by rotation of the king-pin, be brought into register with a selected one of the holes 50 in the corresponding flanged portion 49 or 49a. A locking pin 60 is attached by a chain 60a to the plate 53 and can be inserted in one of the sleeves 59 for engagement in the hole 50 in one of the flanged portions 49 with which the sleeve has been brought into register, thereby locking the king-pin against rotation in the socket 47. It will be noted from FIGURES 2 and 13 that the ears 58 and their sleeves 59 are not in diametrical alignment with each other, one being angularly offset with reference to the other in the diametrical sense, so that when the sleeve of one ear is in register with a hole 50 in the corresponding flanged portion 49 or 49a of the socket 47, the sleeve of the other ear will lie between two adjacent holes 50 in the flanged portion associated with this sleeve. Under these conditions, and with, say, four holes in each flanged portion, the two sets of holes being arranged symmetrically with respect to each other, it becomes possible to obtain eight different positions of adjustment of the turntable according to which one of the two sleeve is used for reception of the locking pin 60.

A centrally disposed bracket 61 forming part of the king-pin 51, projects from the upper face of the plate 53. In combination with the bracket 61 there is provided an upwardly projecting link 62 which, as shown in FIGURE 14, is of box-like form. The link is so positioned that its lower end portion freely straddles the bracket 61, being pivotally connected to the bracket by means of a horizontally disposed pivot pin 63 so that the link can rock forwardly and rearwardly. As again shown in FIGURE 14, the lower end portion of the link 62 contains oppositely inclined plates 64 which are adapted to come into engagement with the front and rear edges of the bracket 61 so as to limit the extent to which the link can rock forwardly and rearwardly. The upper end of the link 62 is bifurcated for reception of the eye in the rear end of the usual adjustable top link of the tractor linkage, a pivot pin 65 being provided to enable the link 62 to be pivotally connected to the said eye.

Normally, the turntable 46 is so set that the drawbar 55 and trunnion pin 57 lie parallelly to the crotch portion 4 of the frame 1 as shown in FIGURE 2. When, with this setting, the trunnion pins 57 and pivot pin 65 are connected to the three-point linkage on the tractor, the linkage will act, in conjuction with the ground wheels 32 and 33, to support the implement in correct operative position, while the implement will project at an angle from one side of the tractor. The angle of projection can be varied by withdrawing the locking pin 60 from its locking position, re-setting the turntable and then re-engaging the pin. During operation of the implement, a part of the weight of the implement will be taken by the ground wheels 32 and 33, while the remainder of the weight will be taken by the tractor linkage, the correct working position of the implement thus being dependent partly on the supporting effect of the ground wheels and partly on the supporting effect of the tractor linkage. When the direction of forward movement of the tractor is changed by steering, the wheels 32 and 33, being of the free castor type, will at once accommodate themselves to the change of direction so that no excessive lateral strain will be imposed on the tractor linkage or on the implement itself.

Also during operation of the implement, the tractor linkage and ground wheels 32 and 33 will serve to maintain the frame 1 at such a level that the tines 14 on the lower parts of the finger-wheels will lie a little above the surface of the ground as depicted in FIGURE 1, the finger-wheels being caused to rotate solely by reason of contact of the tines with the cut crop lying on the ground.

When the extension piece 5 is connected to the side member 2 of the frame 1, the implement will operate as a side rake, while when the extension piece is connected to the side member 3, the implement will operate as a swath turner. For increasing the versatility of the implement when in use, there may, if desired, be provided an extra finger-wheel 8e with crank 16 and a clamp 17 adapted to be attached to the side member 3 of the frame as depicted in broken lines at the left-hand bottom corner of FIGURE 2.

As the several finger-wheels are mounted on rearwardly extending cranks 16 which are resiliently suspended by means of the springs 29, the finger-wheels are able to rise and fall relatively to the frame 1 should the tines 14 come into contact with irregularities on the ground. Further provisions for resiliency are afforded by reason of the fact that the ground wheels 32 and 33 are themselves spring mounted. This resiliency may be even further augmented by providing the ground wheels with pneumatic tires.

By reason of the fact that the link 62 is able to rock forwardly and rearwardly to a limited extent, the rear end of the implement is free to rise and fall to a corresponding extent relatively to the tractor so as to compensate for changes of contour as the tractor moves over the ground.

By setting the turntable 46 so that the drawbar 55 extends at right-angles to the side members 2 and 3 of the frame 1, as depicted in broken lines in FIGURE 2, the implement will then lie directly behind and substantially in alignment with the tractor, the implement thus being in the most convenient position for transportation from one place to another as it will not then have any excessive lateral overhang.

When the implement is in the operating or transporting position the tractor linkage may be raised to such an extent as to cause the link 62 to rock forwardly until the front plate 64 therein comes into engagement with the front edge of the bracket 61 on the plate 53 forming part of the king-pin 51, the plate then acting as a stop. By then raising the tractor linkage still further, the linkage will act to lift the implement completely clear of the ground, thereby making it easier to manoeuvre the tractor under certain conditions.

When the implement is not connected to a tractor, the locking pin 60 can be withdrawn from the hole 50 in which it has been engaged, whereupon the king-pin 51 can be rotated by 180 degrees in the socket 47, thus bringing the drawbar 55 to a position in which the longer and shorter end portions on each side of the lug 54 are reversed. To appreciate the advantages of this provision for reversing the drawbar, it should be explained that one of the most desirable features in the connecting of the implement to the tractor is that the distance, in a transverse plane, between the leading tines on the first finger-wheel and the outside edge of the tire of the corresponding tractor wheel, should be kept as small as possible and also approximately constant, irrespective of the make or model of tractor to which the implement is applied. By joining the drawbar 55 to the lug 54 so that the drawbar has long and short end portions extending from the lug, in other words, by placing the lug in an off-centre position relatively to the total length of the drawbar, and by constructing the turntable 46 in such manner that the drawbar can be turned by 180 degrees about the axis of the turntable as described, it becomes possible to ensure that the implement will, in the sense explained, lie in the most advantageous position relatively to the particular make or model of tractor to which it is connected. To explain the point more fully, it becomes possible, with the turntable and drawbar arrangement described, to so position the connections between the implement and the tractor that the distance between the leading tines on the first finger-wheel and the outside edge of the tire on the corresponding rear wheel of the tractor, having been predetermined when the implement is attached to a tractor in which the distance between the rear wheels is comparatively small, will remain substantially the same when the implement is attached to a tractor in which the distance between the rear wheels is comparatively great. Apart from what has already been stated, an advantage of this particular arrangement is that, for the majority of makes or models of tractors, it is possible to utilise a standard design of the implement, while ensuring that the raking action will commence not only close to, but at a substantially constant distance from one side of the tractor irrespective of the width between the rear wheels of the tractor, thus making it possible to rake a cut crop right away from fences and also from around any obstruction that may exist in a field.

When the implement, constructed as described, is connected to the tractor it becomes, by definition, a fully mounted machine and thus utilizes the advantages of a hydraulic lift, while still being capable, when in operation, of behaving, with respect to the contour of the ground, substantially in the same manner as a trailed implement which depends entirely on the ground for its support.

The implement may be provided with means for holding it on an even keel when it is detached from the tractor, so as to protect the tines on the finger-wheels from being damaged, and the said wheels from becoming strained, due to tilting of the implement when not in use. For this purpose, and shown in FIGURES 1 and 2, a bracket 66 is secured to the lower portion of the side member 3 of the frame, there being pivotally secured to the bracket or leg or prop 67 which can be swung down from a position in which it extends horizontally clear of the ground as shown in broken lines in FIGURE 1, to a position in which it stands vertically and rests, by its lower end, on the ground as shown in full lines in the same figure. When in its operative position, the leg or prop 67 acts, in conjunction with the ground wheels 32 and 33 to keep the frame 1 in such a position that the tines on the finger-wheels 8 are kept clear of the ground. When the implement has been attached to the tractor, the leg or prop is swung up out of the way, being suitably held in this position, as by means of a removable pin 67a.

Figure 16:
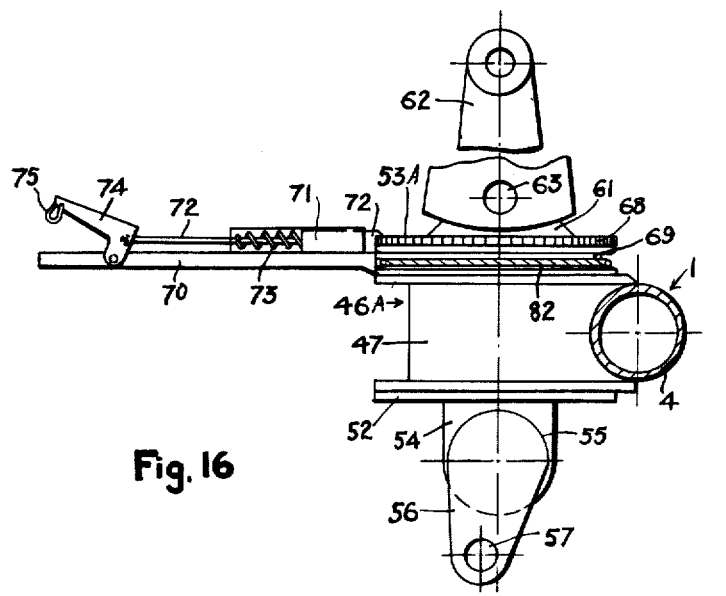
FIGURE 16 is a fragmentary side elevational view, on an enlarged scale, of a turntable assembly forming part of the implement of FIGURE 15.
Figure 17:
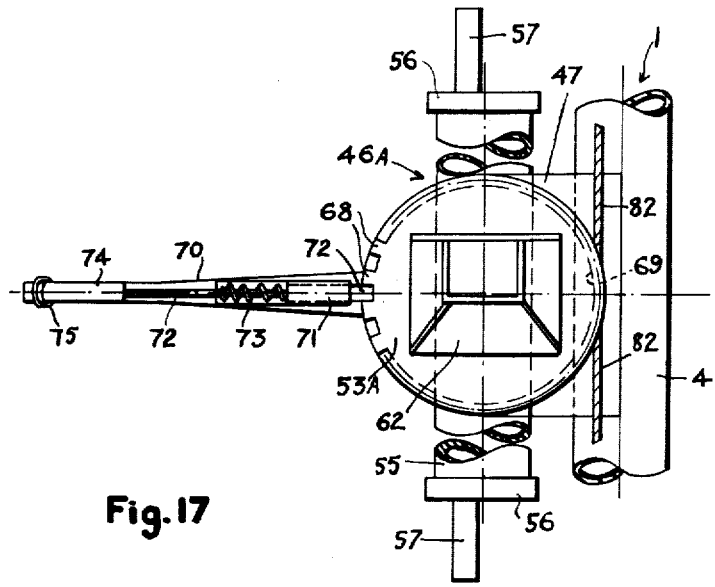
FIGURE 17 is a fragmentary plan view of the device shown in FIGURE 16.

The implement illustrated in FIGURES 15 to 17 has many features in common with that described with reference to FIGURES 1 to 14 and, to avoid repetition of description, the same reference symbols are used to indicate identical parts. In the present instance, the turntable 46A, although fundamentally of the same form as the turntable 46 previously described, includes certain modifications relating to the means employed for locking it in adjusted position. Moreover, although the ground wheel 33 on the rear end of the extension piece 5 is, as before, of the castor type, means are provided in association with the turntable 46A for turning the wheel 33 about the axis of the bearing sleeve 42 so that it rotates in a plane lying at a selected angle to the length of the frame 1, and for locking it in the selected position.

In the construction now being described, the plate 53A on the king-pin 51 of the turntable 46A is spaced above the upper face of the socket 47 and is formed with teeth 68 extending around its outer edge. A pulley 69 is arranged between the plate 53A and the upper face of the socket 47, the pulley being so mounted that it can rotate relatively to both the socket 47 and the king-pin 51. A radially projecting arm 70 is secured to the pulley 69 and carries a sleeve 71 acting as a guide for a radially extending latch 72 the inner end of which normally engages with the teeth 68 on the plate 53A under the influence of a spring 73. The outer end of the latch 72 is connected to a trigger 74 pivotally mounted on the arm 70 near the outer end of the latter. It will be appreciated that, with this arrangement, the latch 72 normally acts to hold the pulley 69 against rotation relatively to the king-pin 51. By depressing the trigger 74, the latch 72 will be drawn out of engagement with the teeth 68 on the plate 53A, thus permitting the pulley to rotate around the king-pin 51 and thus also relatively to the socket 47. The trigger 74 is provided with a ring 75 which, when the trigger has been depressed, can be engaged over the outer end of the arm 70, thereby holding the latch 72 in its inoperative position while the pulley 69 is being rotated. When the pulley has been turned to the desired angular position around the king-pin 51, the trigger 74 is released, thereby allowing the latch 72 to return to locking engagement with the teeth 68 on the plate 53A. By providing teeth around the entire edge of the plate 53A, the angular setting of the pulley 69 can be varied over a wide range.

As shown in FIGURE 15, a pulley 76 is, in this modification, secured to the upper end of the arm 34 carrying the ground wheel 33. A double-armed lever 77 is pivotally mounted on the leading end portion 4 of the frame 1 at a point near that at which this portion merges into the side member 3. One end of a helical tension spring 78 is connected to one arm of the lever 77, the other end of the spring being connected to an eye-bolt 79 adjustably engaged with a bracket 80 secured to the frame at the junction between the leading end portion 4 and the side member 3, the bolt being secured to the bracket by a nut 81. One end of a cable 82 is connected to the same arm of the lever 77, the cable then extending along the portion 4 of the frame and being reeved around the pulley 69. After leaving the pulley 69, the cable 82 passes slidably through a curved guide tube 83 secured to the frame around the bend between the portion 4 and the side member 2 of the frame, the cable then extending rearwardly along the member 2. At its rear end the cable 82 is connected to a rod 84 which passes slidably through a guide tube 85 secured to the member 2 near the rear thereof, the rear end of the rod 84 being fitted with the female part of a bayonet-type connector 86 arranged adjacent the socket 6 on the rear end of the member 2. A helical compression spring 87 is arranged around the part of the rod 84 lying between the guide tube 85 and the connector 86. The male part of the connector 86 is fitted to the forward end of a rod 88 which passes slidably through a guide tube 89 secured to the extension piece 5. The rear end of the rod 88 is connected to the forward end of a second cable 90 extending rearwardly along the extension piece 5 (shown, in this instance, as connected to the side member 2 of the frame), the rear end portion of the cable 90 being engaged around the pulley 76, after which the cable is connected to the rear end of a forwardly extending helical tension spring 91. The forward end of the spring 91 is connected to an eye-bolt 92 adjustably engaged with a bracket 93 secured to the extension piece 5, the bolt being secured to the bracket by a nut 94. The springs 78, 87 and 91 together act to maintain the cables 82 and 90 in a tensioned condition so that there is no loss of motion when the cables are operated.

With the arrangement described, and bearing in mind that the drawbar 55, in effect, forms part of and rotates with the king-pin 51, when the latch 72 is released by depression of the trigger 74, the pulley 69 can be rotated about the axis of the king-pin for varying the angular setting of the ground wheel 33 relatively to the drawbar 55. When the desired angular relationship between the wheel and drawbar has been obtained, the latch 72 can be released so that it again comes into engagement with the teeth 68 on the plate 53A, thus locking the pulley to the plate and hence to the king-pin 51, and thereby holding the wheel 33 in the predetermined angular position with reference to the drawbar.

When the turntable 46A is connected to the tractor linkage and the tractor moves over the ground, a change in the direction of movement of the tractor due to steering, will result in a change in the angular position in a horizontal plane of the drawbar 55 relatively to the frame 1 of the implement, with consequent rotation of the king-pin 51 in the socket 47 and rotation of the pulley 69 with the king-pin. Thus the angular position of the ground wheel 33 will vary in relation to the frame of the implement concomitantly with changes in the direction of movement of the tractor, such variations in the angular position of the wheel ensuring that when the tractor moves in a curved path, the finger-wheels 8 will always lie at the pre-selected raking angle with respect to the crop that is being operated upon, the extent of the angular variation of the implement relatively to the tractor being determined by the ratio between the diameters of the pulleys 69 and 76.

Means are provided to ensure that the same conditions will obtain after the extension piece 5 has been detached from the side member 2 of the frame 1 and then attached to the side member 3. For this purpose, there is provided a third cable 95 one end of which is connected to the arm of the lever 77 opposite that to which the cable 82 is connected, the cable 95 then extending rearwardly and passing slidably through a curved guide tube 96 secured to the frame 1 around the bend between the front end portion 4 and the side member 3. The rear end of the cable 95 is fitted with the female part of a bayonet-type connector 97 similar to the connector 86, this part lying adjacent the socket 6 on the rear end of the side member 3. A compression spring 98 is arranged around the part of the cable 95 extending between the guide tube 96 and the connector 97.

When it is desired to transfer the extension piece 5 from the side member 2 to the side member 3, the male part of the connector 86 is withdrawn from the female part, thus permitting the extension piece and the parts carried by it, to be disconnected from the socket 6 at the rear end of the side member 2 and connected to the socket 6 at the rear end of the side member 3. When the connection has been made, the male part of the connector on the forward end of the cable 90 is engaged in the female part of the connector 97 so that the cable 90 then forms a continuation of the cable 95.

When, with the last mentioned arrangement, the latch 72 is withdrawn from engagement with the teeth 68 on the plate 53A and the pulley 69 is rotated around the king-pin 51 to adjust the angular setting of the ground wheel 33 relatively to the drawbar 55, the latch then being restored to locking position, the cable 82 will act, through the lever 77, to operate the cables 95 and 90 so that the angular position assumed by the ground wheel 33 relatively to the frame will be varied in correspondence with the position assumed by the drawbar relatively to the frame 1 and thus with the line of movement of the tractor to which the implement is attached.

Figure 18:
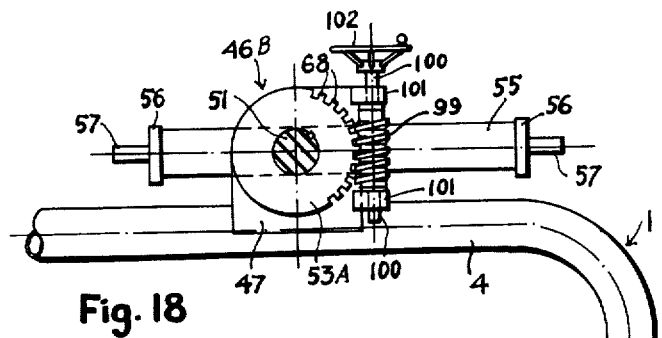
FIGURE 18 is a plan view, partly in section, of a modified form of turntable assembly.

FIGURE 18 shows another modified form of turntable 46B described with reference to FIGURES 15 to 17, there being provided, in this instance, means which not only facilitate rotation of the king-pin 51 in the socket 47, but act at the same time to hold the king-pin, and thus the drawbar 55, in the selected position of adjustment.

According to this modification, the latch 71 and the parts for supporting and operating it, are dispensed with, and in their place there is provided a horizontal and forwardly projecting worm 99 whose teeth are in mesh with the teeth 68 on the plate 53A. The shaft 100 of the worm is journalled for rotation in bearing blocks 101 provided on the upper face of the socket 47, the forward end of the worm shaft being fitted with a hand-wheel 102 for rotating the worm when desired. With the arrangement just described, rotation of the worm 99 in either direction will cause corresponding rotation of the plate 53A and king-pin 51, thereby varying the angular setting of the drawbar 55 relatively to the frame 1 and also enabling the drawbar to be rotated through 180 degrees about the axis of the turntable so as to reverse the positions of the shorter and longer end portions of the drawbar for the purpose explained with reference to the embodiment first described. The teeth of the worm 99 are of low pitch so that while the worm is capable of rotating the plate 53A and king-pin 51, these latter parts are incapable of rotating the worm. Thus, the worm serves the double purpose of providing means for readily rotating the king-pin 51 to vary the angular setting of the drawbar 55, and of locking the king-pin against unintended rotation. The hand-wheel 102 may be positioned that it is within easy reach of the driver of the tractor to which the implement is attached, it thus being possible to vary the angular position of the frame 1 relatively to the tractor from the driving seat while the implement is moving over the ground.

Figure 19:
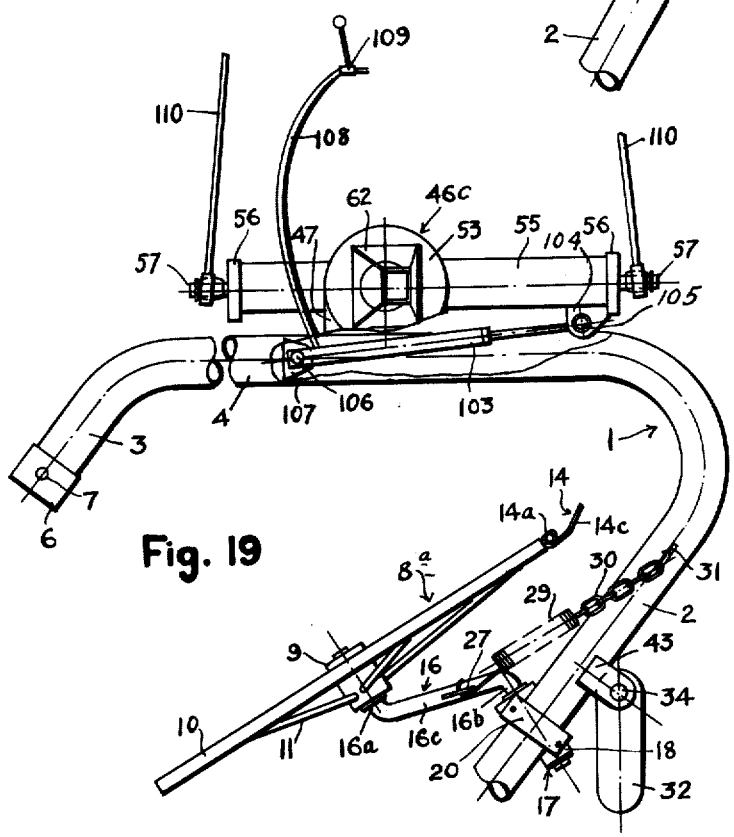
FIGURE 19 is a fragmentary plan view illustrating another modified form of turntable assembly.

FIGURE 19 illustrates a further modified form of turntable 46C, the same reference symbols being used, as before, to indicate parts that are identical. In the present arrangement, the angular setting of the drawbar 55 is dependent on the use of a hydraulic jack 103, one end of the jack being engaged between a pair of rearwardly projecting lugs 104 secured to the drawbar 55 near one end thereof, and being pivotally connected to these lugs by means of a pivot pin 105. The jack 103 extends in a generally transverse direction, the other end of the jack being pivotally connected, by means of a pivot pin 106, to a bracket 107 secured to and depending from the lower portion of the leading end portion 4 of the frame 1 of the implement. The bracket 107 is so positioned that, whereas the pivot pin 105 lies to one side of the turntable 46C, the pivot pin 106 lies to the other side of the turntable. With this arrangement and by reason of the fact that the jack 103 is connected, on the one hand, to the drawbar 55 carried by the rotatable king-pin 51 of the turntable, and, on the other hand, to the frame 1, the jack can act as a strut.

The cylinder of the jack 103 is supplied with oil under pressure from the pump of the hydraulic system on the tractor, by means of a flexible pipe 108. If desired, the pipe may be fitted with a hand-controlled valve 109 which would be additional to the valve or valves normally forming part of the hydraulic system on the tractor.

In FIGURE 19 the bottom links of the tractor lift mechanism are indicated at 110, the eyes at the rear ends of the links being shown connected to the trunnion pins 57 on the drop-arms 56 at the ends of the drawbar 55.

When the implement has been connected to the tractor and is in operation for side raking or swath turning, the frame 1 thus being at an angle to the direction of movement of the tractor so that it projects from one side thereof, the forces to which the finger-wheels 8 are subjected as a result of their contact with the crop, tend to cause the jack 103 to contract, with a consequent diminishing of the distance beween the pivot pins 105 and 106. Thus, if movement of the implement in a horizontal plane about the axis of the turntable 46C, were unrestricted, the implement would tend to move from its laterally projecting position, thereby reducing or neutralizing the angle of attack of the finger-wheels 8 on the crop. By the application, however, of hydraulic pressure through the pipe 108 to the cylinder of the jack 103, the implement can always be maintained at the correct angle relatively to the direction of movement of the tractor. Moreover, by controlling the flow of oil to and from the cylinder of the jack, the angle at which the implement lies relatively to the tractor, can be varied at any time while the implement is in operation.

FIGURES 20 and 21 illustrate a modified form of turntable 46D having an arrangement, applicable to the various designs of the turntable, whereby the extent to which a drawbar 55A projects from either side of the lug 54 on the king-pin 51 can be varied, thereby giving even greater scope for adjusting transversely the position of the implement in general with reference to the tractor linkage.

According to the arrangement now being described, the drawbar 55A is slidably engaged in a bearing 111 extending through the lug 54 from one side face thereof to the other, the drawbar thus being slidable axially in the bush so that it can either be positioned symmetricaly with respect to the bearing 111, or can be caused to project to a greater or lesser extent from either side of the latter. The drawbar 55A is provided with a longitudinally extending key 112 engaging slidably in a keyway 113 formed in the bearing 111, the drawbar 55A thus being restrained against rotation about its axis while being free for axial sliding movement. The drawbar 55A is held in its adjusted position relatively to the lug 54 by means of a set-screw 114 which is engaged in a nut 115 welded to the lug 54 and the inner end of which passes through a hole 116 in the bearing 111 and bears against the drawbar 55A.

FIGURES 22 and 23 illustrate another embodiment of the implement according to the invention. In this embodiment the frame 1 is substantially of the same shape as in the embodiments previously described. The side member 2 of the frame 1 is fitted with a forwardly arranged ground wheel 32 and a rearwardly arranged ground wheel 33A, the wheels being for preference, of the free castor type and their mountings being similar to the mounting described with reference to FIGURES 9 and 10, except that both of them are mounted on the frame side member 2.

The finger-wheels 8a and 8b are supported from the side member 2 of the frame, being mounted for rotation on straight axles 118 suitably connected to the member 2 and extending forwardly thereof. The finger-wheels are arranged in echelon formation and the axles 118 are so set that the wheels rotate in planes lying at an angle to the direction of movement of the tractor 117.

A forwardly extending shaft 119 is secured to the leading end portion 4 of the frame 1 near the free end of this portion, the shaft being arranged at right-angles to the portion 4 and being journalled for rotation in a tube 120. The shaft 119 is held in engagement with the tube 120 by a collar 121 secured to the shaft adjacent the rear end of the tube, and by a collar 122 secured to the free end part of the shaft which projects from the forward end of the tube. It will be seen more particularly from FIGURE 23 that the collar 122 is of part-circular shape and embraces the upper part of the shaft 119 so that it has two ends 123 extending radially from the shaft 119 and spaced from each other. The forward end of the tube 120 is formed with a circular outwardly projecting flange 124 lying just behind the collar 122. A quadrant plate 125 with radially extending ends is secured to the lower part of the front face of the flange 124 by means of bolts 126 which pass through holes 127 in the plate and are engaged in the flange. The plate 125 is accommodated in the gap between the ends 123 of the collar 122, the circumferential length of the plate being less than the distance between the ends of the collar. Thus, while the shaft 119 is free to rotate in the tube 120, the degree of rotation is limited by engagement of either one of the ends 123 of the collar 122 with the corresponding end of the quadrant plate 125. The quadrant plate may, as shown in FIGURE 23, be provided with a greater number of holes 127 than the number of bolts 126 used, thus enabling the angular setting of the plate to be varied.

The tube 120 is secured to the lower edge of a drawbar 55B near one end of the latter, the drawbar being arranged at right-angles to the tube so that it is parallel to the leading end portion 4 of the frame 1. The drawbar 55B is fundamentally of the same form as the drawbar 55 described with reference to the preceding embodiments and its corresponding parts therefore bear the same reference symbols.

The trunnion pins 57 on the drawbar 55B are rotatably engaged in eyes at the rear ends of forwardly projecting links 128 which are secured at their forward ends to a transverse plate 129 adapted to be detachably secured by means of bolts 129a to a supporting bracket 130 on the rear end of the body of the tractor 117.

It will be seen that the implement of FIGURES 22 and 23 is of such construction that when it is attached to the tractor 117, the frame will be free, within limits, to rock transversely relatively to tractor about the axis of the shaft 119, thus avoiding the setting up of undue strains in the assembly and enabling the finger-wheels 8 to act effectively in spite of lateral variations in the ground level between the implement and the tractor. The frame will, moreover, be free to rock upwardly and downwardly relatively to the tractor in a plane extending lengthwise of the tractor, this rocking movement taking place about the axis of the trunnion pins 57, thereby further avoiding the development of undue strains and enabling the finger-wheels to act effectively in spite of variations of ground contour between the implement and tractor in the direction of movement of the latter.

The implement according to the embodiment illustrated in FIGURE 24 includes a frame 1A, the finger-wheels supported by the frame being diagrammatically indicated at 8. In this instance, the implement may be provided with any desired number of ground wheels acting partially to support the frame at the desired distance above the ground. In the drawing only one ground wheel 33A is provided, the wheel being preferably of the free castor type and being arranged at the rear end of the frame 1A.

The forward end of the frame 1A is designed for connection to the standard type of three-point hydraulic linkage on a tractor generally indicated at 117, the linkage being depended on not only for the purpose of establishing a connection between the implement and the tractor, but also for supporting the forward end of the frame at the desired distance above the ground so that the linkage will, in conjunction with the wheel 33A, or wheels, serve to maintain the implement in correct working position while it is in operation.

The forward end of the frame 1A is constituted by a transversely disposed drawbar 55C the ends of which are provided with drop-arms 56C carrying laterally projecting trunnion pins 57C.

To the upper edge of the drawbar 55C there is secured an upwardly extending post 131 arranged at a convenient position intermediate the ends of the drawbar. As the drop-arms 56C and the post 131 are rigidly secured to the drawbar 55C they may be considered as constituting together a single link extending above and below the drawbar.

As previously stated, the three-point hydraulic linkage on the tractor 117 is of standard type. It comprises two rearwardly extending bottom links 132 pivotally mounted at their forward ends on the body of the tractor as indicated at 133, two rearwardly extending hydraulically operated levers 134, two adjustable connecting rods 135 pivotally connected to the rear ends of the levers 134 and to the bottom links 132, and a rearwardly extending adjustable top link 136 pivotally mounted at its forward end to the body of the tractor by means of a pivot pin 137.

To connect the implement to the tractor linkage, the eyes at the rear ends of the bottom links 132 are engaged with the trunnion pins 57C on the drawbar, while the top link 136, after being adjusted for length, is pivotally connected at its rear end to the upper end of the post 131 by means of a pivot pin 133. Thus, when the tractor linkage is raised or lowered by operation of the levers 134, a corresponding raising and lowering movement will be imparted to the forward end of the implement.

If, as is assumed, the rearwardly extending part of the frame 1A is made integral with the drawbar 55C, it becomes possible to raise the tractor linkage to a sufficient extent to cause the implement to be lifted entirely clear of the ground. If, however, the rearwardly extending part of the frame 1A is pivotally connected to the drawbar 55C, a raising of the tractor linkage will merely cause the forward end of the implement to be raised, the ground wheel 33A then always remaining in contact with the ground and the same applying when the linkage is lowered.

Where the rearwardly extending part of the frame 1A is pivotally connected to the drawbar 55C, stops may be provided to limit the extent to which this part of the frame can rock upwardly and downwardly about the axis of the drawbar. In that case, the tractor linkage will still serve to govern the height at which the forward end of the frame lies above the ground, and the rear end of the frame will be free to rise and fall to some extent when the ground wheel 33A meets ground inequalities. When, however, the tractor linkage is raised sufficiently to cause the stops to come into operation, the linkage will serve to lift the entire implement clear of the ground.

Some makes of tractors are fitted with means for locking the hydraulic system when the linkage has been brought to the desired working level. Even so, however, and owing to wear and seepage in the hydraulic system, there may be a tendency for the linkage to creep downwardly from the predetermined working level by reason of the fact that the linkage has to sustain the weight of the implement at the forward end thereof. Difficulty may therefore be experienced in always maintaining the forward end of the frame 1A at the correct distance above the ground while the implement is being used.

To overcome this difficulty there is provided a chain 139 having at one end a shackle 140 engaged over the pivot pin 137 used for connecting the forward end of the top link 136 to the tractor, the other end of the chain being connected to a loop 141 secured to the lower part of one of the drop-arms 56C on the drawbar 55C. The chain 139 thus extends diagonally between the pivot pin 137 and the axis of the trunnion pins 57C on the drop-arms of the drawbar, and provides, in conjunction with the bottom links 132 and the top link 136 a triangulated formation.

The chain 139 is made of such length that it will be fully tensioned when the tractor linkage is in a position in which it serves to hold the forward end of the frame 1A at the correct height from the ground, the chain thus acting positively to restrain the linkage against downward creep under the weight imposed on it by the forward end part of the implement. The chain 139 may be fitted with a turnbuckle 142 to enable its effective length to be varied according to requirements.

While the chain, on becoming tensioned, serves to prevent the tractor linkage from swinging downwardly below a certain level, it does not prevent the linkage from being raised above that level to cause a raising movement to be applied to the forward end of the implement or to the implement as a whole, as the chain, being flexible, then loses tension and becomes slack.

FIGURE 25 shows a modification of the linkage arrangement illustrated in FIGURE 24. In this case, the chain 139 is replaced by a rod 143 one end of which is formed with an eye 144 engaged between a pair of lugs 145 secured to the rear end of the body of the tractor 117 at a point lying between the bottom links 132 and the top link 136, the eye 144 being pivotally connected to the lugs 145 by means of a pivot pin 146. The opposite end of the rod 143 is screwed into one end of an elongated plate 147 which, in effect, forms a continuation of the rod, the screw-threaded part of the rod being provided with a nut 148 which bears against the corresponding end of the plate 147 and thus serves to lock the rod and plate together. The plate 147 is formed with a slot 149 which extends in the direction of the length of the plate and in which is engaged the pivot pin 138 serving to connect the upper end of the post 131 with the rear end of the top link 136. The lugs 145 on the tractor are so positioned that the rod 143 and plate 147 lie along a line extending diagonally between the pivot pin 138 and the axis about which the forward ends of the bottom links 132 are pivotally mounted on the tractor body. Thus, the rod 143 and plate 147 together provide, in conjunction with the bottom links 132 and the top link 136, a triangulated formation.

When the tractor linkage is so positioned as to hold the forward end of the implement at the correct working height from the ground, the pivot pin 138 will bear against the forward end of the slot 149, the rod 143 thus being in compression and acting as a strut positively restraining the linkage from dropping out of position due to creep, even when pressure in the hydraulic system is no longer maintained. The slot 149 in the plate 147, however, permits the linkage to be raised at any time with a consequent raising of the forward end of the implement or of the implement as a whole.

The effective length of the rod 143 may be varied according to requirements, by releasing the plate 147 from the pivot pin 138, then loosening the nut 148, and then screwing the plate to a greater or lesser extent on to the rod 143, the nut then being tightened up again and the plate re-engaged with the pin 138.

The implement when constructed in accordance with the embodiment shown in FIGURES 26 and 27 is again intended for connection to three-point hydraulic linkage on a tractor generally indicated at 117 in FIGURE 26, but is designed to meet the case where, because the tractor is of a lightweight type, or the implement is comparatively large, or by reason of other considerations, it is not convenient to lift the implement entirely clear of the ground when it is desired to render it inoperative.

As in FIGURES 24 and 25, the three-point linkage of the tractor 117 shown in FIGURE 26 is of standard type, its various parts therefore being marked with the same reference symbols.

For use in conjunction with the tractor linkage, there is provided a triangular frame generally indicated at 150 in FIGURES 26 and 27. The frame 150 comprises oppositely inclined side members 151 the lower ends of which are connected to the ends of a horizontal bar 152 representing the base of the triangle, the bar being provided with trunnion pins 153 which projects through the lower ends of the side members 151 and are pivotally engaged in the usual eyes at the rear ends of the bottom links 132 of the tractor linkage as shown in FIGURE 26. The upper ends of the side members 151 of the frame 150, which represent the apex of the triangle are spaced apart sufficiently to receive the eye at the rear end of the top link 136 of the tractor linkage, and are formed with aligned holes 154 (FIGURE 27) through which passes a pivot pin 138 (FIGURE 26) acting to pivotally connect the upper end of the frame 150 to the rear end of the top link 136. A bracing plate 155 extends between the side members 151, and to this plate and the horizontal bar 152 there is joined a pair of centrally disposed bars 156 spaced parallel from each other. The bars 156 are formed with rearwardly projecting cheeks 156a containing a series of aligned holes 157 spaced above one another.

The implement includes an elongated frame 1A provided with any desired number of ground wheels which may act wholly or partially to support the frame 1A at the desired distance above the ground. In the embodiment shown, the frame is provided with a single ground wheel 33A arranged at the rear end of the frame, the wheel being, for preference, of the free-castor type as shown. The frame 1A supports a plurality of finger-wheels one of which is indicated generally at 8 in FIGURE 26. As in the embodiments described with reference to FIGURES 1 to 19, each finger-wheel is mounted for rotation on the pin 16a of a rearwardly extending crank 16 the shaft 16b of which is journalled for rotation in a bearing member 17 suitably secured to the frame 1, the web 16c of the crank being provided with an upwardly projecting lever-arm 27. The bearing member 17 may be in the form of a clamp of the construction already described with reference to FIGURES 7 and 8.

The forward end of the frame 1A is constituted by a transversely disposed drawbar 55D formed with a forwardly projecting arm 158 engaged between the cheeks 156a on the bars 156 of the triangular frame 150. The arm 158 contains a hole in alignment with the lowermost pair of holes 157 in the cheeks 156a, a pivot pin 159 being engaged in the registering holes.

With the arrangement just described, the tractor linkage will act, through the frame 150, to support the forward end of the implement, the remaining support for the implement being provided by the ground wheel 33A at the rear end of the frame 1A. By raising or lowering the linkage, the forward end of the frame can be brought to a position in which, in conjunction with the wheel 33A it is held at the correct working height from the ground when the implement is in use. By reason of the pivotal connection provided by the pivot pin 159, the rear end of the implement is given freedom to rise and fall relatively to the tractor to compensate for changes of ground contour between the tractor 117 and the wheel 33A on the implement.

To the upper edge of the drawbar 55D there is secured a pair of upwardly projecting lugs 160 to which a bell-crank lever 161 is pivotally connected by means of a pivot pin 162, the bell-crank lever having an upwardly extending arm 161a and a rearwardly extending arm 161b. The forward end of a tie-rod 163 is pivotally connected to the pivot pin 138 on the upper end of the triangular frame 150, the rear end of the rod being pivotally connected to the upper end of the arm 161a of the bell-crank lever 161. The tie-rod 163 is fitted with a turnbuckle 164 enabling the effective length of the rod to be varied.

To the end of the rearwardly extending arm 161b of the bell-crank lever 161 there is connected one end of a cable 165. From the arm 161b the cable passes downwardly and is engaged over a pulley 166 rotatably supported on an axle 167 secured to and extending rearwardly from the drawbar 55D, the cable then returning and being engaged with a pulley 168 mounted for rotation on a bracket 169 secured to the frame 1A of the implement. From the pulley 168, the cable 165 extends rearwardly and is joined to the lever-arm 27 on the crank 16 carrying the leading finger-wheel 8. For the remaining finger-wheel or finger-wheels, the cable is continued rearwardly from the lever-arm 27 and is joined to the lever-arm on the next crank. If desired, a helical tension spring 170 may be embodied in that part of the cable extending between the pulley 168 and the lever-arm 27 on the crank of the leading finger-wheels.

When the implement is attached to the tractor 117, the top link 136 is so adjusted in length that the distance between the pins 137 and 138 at its extremities is less than the distance between the pins 133 and 153 at the extremities of the bottom links; furthermore the tie rod 163 is so adjusted for length that the cable 165 will act, through the lever-arms 27 and cranks 16, to hold the finger-wheels at the correct working position relatively to the ground.

When the tractor linkage is swung upwardly to raise the forward end of the implement, the tie-rod 163 will act to apply a differential movement to the bell-crank lever 161, causing the arm 161a of the lever to swing forwardly relatively to the frame 1 of the implement, with consequent upward movement of the arm 161b of the lever relatively to the frame. Such upward movement of the arm 161b will cause a pull to be applied to the cable 165 so that it will act to move the lever-arms 27 forwardly, thereby causing an upward swinging movement to be applied to the cranks 16. The finger-wheels will thus be raised from their working positions relatively to the frame, while the ground wheel 33A will continue to remain in contact with the ground, thereby relieving the tractor linkage of excessive strain while the implement is being towed from one site to another. The reverse action will take place when the tractor linkage is swung downwardly, thereby restoring the frame 1a and finger-wheels 8 once again to working position.

When the implement is in operation, the cable 165, being flexible, will allow the finger-wheels 8 to rise relatively to the frame 1a should their tines strike any irregularities on the ground, the wheels thereafter returning, of their own accord, to normal working position.

A limiting pin 157a may be inserted in a selected pair of the unoccupied holes 157 in the cheeks 156a on the bars 156 of the triangular frame 150, the pin coming into engagement with the upper edge of the arm 158 on the drawbar 55D when the tractor linkage has been lowered to a particular extent, the pin thus locking the linkage against further and excessive downward movement. The arrangement may in fact be such that when the limiting pin is in engagement with the arm 158, the forward end of the frame 1a of the implement will be at the correct working height from the ground. Under these conditions, the locking effect produced by the pin will relieve the hydraulic system on the tractor of load, thereby neutralising any tendency for the linkage to creep below its correct supporting position due to wear or leakage in the system and to the weight of the forward part of the implement. This is a further instance of the triangulating effect described with reference to FIGURES 24 and 25, the limiting pin 157a then taking the place of the chain 139, or rod 143 and plate 147.

FIGURES 28 and 29 illustrate an embodiment of the invention in what may be regarded as its simplest form.

The implement comprises a frame 1B which may be of the same shape as those previously described, the frame carrying a plurality of finger-wheels one of which is indicated diagrammatically at 8 in FIGURE 28. The frame is provided with at least one ground wheel 33A arranged at the rear end of the frame, this wheel being preferably of the free-castor type as shown.

The frame 1B has a transversely extending forward end portion which acts, in whole or in part, as a drawbar 55E, for which purpose it is provided with two spaced drop-arms 56E carrying laterally projecting trunnion pins 57E. The trunnion pins are engaged rotatably in eyes in the rear ends of forwardly projecting links 128 joined to a transverse plate 129 which is detachably secured by means of bolts 129a, to a bracket 130 on the rear end of the body of a tractor 117 (FIGURE 28), the arrangement in this latter respect being that shown in FIGURE 22.

It will be seen that the implement of FIGURES 28 and 29 depends for its support at the correct position with respect to the ground, partly on the rear ground wheel 33A, and partly on a connection of the drawbar at the forward end of the frame to the tractor 117 through the medium of the links 128, plate 129 and bracket 130.

When the implement has been connected to the tractor 117 and is in operation, the implement is free to rise and fall in a vertical plane relatively to the tractor, about the axis of the trunnion pins 57E, the implement thus accommodating itself to any ground inequalities existing between the ground wheel 33A and the tractor.

The finger-wheels 8 may be supported from the frame 1B in any desired manner, as for example in accordance with any one of the arrangements herein described.

In the embodiments shown in FIGURES 1 to 19, the finger-wheels are mounted on cranks 16 supported by bearing members 17 connected to the frame 1, and are held resiliently in normal operative position by helical tension springs 29 and chains 30 connected between the webs 16c of the cranks and the frame.

FIGURE 30 shows a modified arrangement for holding the finger-wheel resiliently in normal operative position. In this arrangement, in place of tension springs and chains, the shaft 16b of each crank 16 has a portion 16d extending beyond the web 16c towards the finger-wheel 8 and around this extended portion 16d there is arranged a torsion spring 171 one end of which is anchored to the portion 16d while the other end is anchored to a lug 172 provided on an adjacent part of the frame 1.

FIGURES 31 and 32 show an arrangement in which the cranks 16 are positively held against swinging downwardly beyond a certain position, but are still free to swing upwardly to a limited extent should the finger-wheels 8 strike an obstruction when the implement is in operation. In this particular arrangement, the shaft 16b of each crank is provided with a collar 173 arranged near one end of the bearing member 17, the collar being of part-sectoral shape so that it has two radially extending upper ends 174 (FIGURE 32) spaced from each other. The corresponding end of the bearing member 17 is provided with a projection 175 lying in the space between the ends 174 of the collar 173. The projection 175 has side edges 176 radiating from the axis of the crankshaft 16b, the distance between these edges being less than the distance between the ends 174 of the collar 173.

With the arrangement just described, and when the implement is in condition for use, the crank 16 of each finger-wheel 8 swings downwardly until one of the ends 174 of the collar 173 comes into engagement with the corresponding side edge 176 of the projection 175, the projection thus acting as a stop which determines the lowest position that the finger-wheel can assume relatively to the frame 1. Should the finger-wheel meet an obstruction, the free space between the ends 174 of the collar 173 and the side edges 176 of the projection 175 will permit the wheel to rise relatively to the frame 1 by reason of the fact that the projection leaves the crank 16 free to swing upwardly from its lowermost position. Should, for any reason, the crank be swung upwards violently, the end 174 of the collar 173 nearest the crankpin 16a will come into engagement with the corresponding side edge 176 of the projection 175, thus preventing the crank from turning over completely to the other side of its centre point.

In the embodiment according to FIGURE 22, the finger-wheels 8 are mounted for rotation on straight axles 118 connected to the side member 2 of the frame 1 of the implement.

FIGURES 33 and 34 show how, even when the finger-wheels are mounted on straight axles 118, provisions can still be made to allow the such wheels to rise and fall relatively to the frame 1. In the arrangement according to these figures, the axle 118 of each finger-wheel is secured to and projects from a sleeve 177 rotatably engaged around the corresponding part of the frame 1, the sleeve thus acting as a hinge permitting the wheel to move upwardly and downwardly relatively to the frame. The sleeve 177 is held against axial displacement by stops 178 (FIGURE 34) projecting from the frame adjacent each end of the sleeve. The sleeve contains an arcuate slot 179 arranged in the side of the sleeve that is most remote from the finger-wheel, and through this slot there freely projects a tongue 180 secured to and extending from the frame 1.

Under the weight of the finger-wheel 8, the sleeve 177 tends to rotate in an anti-clockwise direction as viewed in FIGURE 33, thus bringing the lower end of the slot 179 into engagement with the fixed tongue 180. The tongue thereby acts as a stop preventing further rotation of the sleeve 177 in the direction mentioned and determining the lowermost position that the wheel can assume relatively to the frame 1.

Should the finger-wheel 8 strike an obstruction while the implement is in use, the slot 179 will give the sleeve 177 freedom to rotate in a clockwise direction so that the wheel can move upwards relatively to the frame sufficiently to clear the obstruction.

It is preferred that the amount by which the finger-wheel can move upwardly relatively to the frame shall not be dependent entirely on the length of the slot 179. Accordingly, there is provided on the sleeve 177 an arm 181 arranged a little above the upper end of the slot and projecting in the same general direction as the tongue 180, the arm being fitted with a set-screw 182 projecting towards the tongue and provided with a nut 183 for locking it in set position. By adjusting the screw 182, the distance between its lower end and the tongue 180 can be varied, thereby determining the amount by which the finger-wheel can move upwardly from its lowermost position.

In FIGURE 33 the finger-wheel 8 is shown to be so positioned that it rotates in a vertical plane when the lower end of the slot 179 is in engagement with the tongue 180. The lower end of the slot may, however, be so positioned that when it is in engagement with the tongue, the axle 118 will be inclined from the horizontal, the wheel thus rotating in a plane which is inclined to one side or the other from the vertical.

By connecting the tines 14 to the rims 10 of the finger-wheels 8 in the manner described with reference, more particularly, to FIGURES 3 to 5, it becomes possible, in the various forms of the implement disclosed, to remove the tines and replace them by others of different form, thus enabling the implement to be converted from a side rake or swath turner, into an implement suitable for use in carrying out other agricultural operations, such as scarifying or cultivating the soil.

Another way of achieving the same result would be by retaining the finger-wheels on their axles in such a way that they can readily be removed and replaced by finger-wheels having tines suited to the particular kind of work to be performed. This could easily be accomplished where the finger-wheels are retained on their axle by keeper pins of the kind indicated at 26 in FIGURE 3.

A further embodiment of the invention has for its purpose the attainment (by methods next to be described of mounting the finger-wheels 8 on their axles) of a more efficient raking action by virtue of the finger-wheel mountings being of such construction that, with rise and fall of the wheels relatively to the frame 1, the plane in which the wheels rotate varies relatively to the frame of the implement.

While in the embodiments in which the finger-wheels 8 are mounted on cranks 16, the pins 16a of the cranks are shown to extend parallelly to the shafts 16b of the cranks, the pins may be arranged at an angle to the shafts so that their axes intersect at a particular point at one side or other of the web 16c. With this construction, the cranks, besides allowing the finger-wheels to rise and fall relatively to the frame 1 so as to avoid damage to the tines or wheels due to ground irregularities, will also permit of variation of the plane of rotation of the wheels relatively to the frame so that the wheels will remain in the most advantageous operative position irrespective of the contour of the ground immediately confronting the wheels. More specifically, the object aimed at is to set the crankpin 16a of each crank 16 at such an angle to the crankshaft 16b that when the crank is in a mid-position in elevation, the finger-wheel carried by this pin will rotate in a plane which is perpendicular to the transverse plane of the frame of the implement, and when the crank pin is in a lowered position, the finger-wheel will rotate in a plane at one angle to that perpendicular, while when the crankpin is in a position above the mid-position, the finger-wheel will rotate in a plane at an opposite angle. To obtain the best results it is desirable that the crankpin 16a be set at such an angle to the crankshaft 16b, that when the axes of these two parts are subtended so that they intersect, they will include an angle which is greater than 10 degrees.

The arrangement described with reference to FIGURES 33 and 34 is also capable of giving the result to which reference has been made. To achieve this result, the tongue 180 is so positioned that when the finger-wheel 8 is in a vertical plane, the tongue will lie intermediate the lower and upper ends of the slot 179 or intermediate the lower end of the slot and the setscrew 182 if provided. Thus, as the axle 118 carrying the finger-wheel is supported from the frame 1 by means of the rotatable sleeve 177, the wheel will rotate in a plane that is inclined to one side of the vertical when it moves downwardly from its intermediate position relatively to the frame, and to the other side of the vertical when it moves upwardly from such position.

Where, as shown for example, in FIGURES 1, 2, 15, 22 and 30, the finger-wheels 8 rotate in planes lying at an angle to the centre-line of the part of the frame 1 from which they are supported, it is desirable that the angle should not be less than 10 degrees.

In the embodiments illustrated more particularly in FIGURES 1 and 2 and 15, 19 and 22, it will be seen that when the implement is attached to the tractor and is in working position, the finger-wheels 8 lie ahead of the part of the frame 1 from which they are supported, the cranks 16 or axles 118 constituting the mountings for the wheels 8 thus extending from the wheels to the related part of the frame in a direction away from the direction of movement of the tractor. The same arrangement may apply in the other embodiments of the implement disclosed.

In all embodiments, the ground wheels 32 and 33 may be replaced by skids.

What I claim and desire to secure by Letters Patent of the United States of America is:

1. A side rake adapted to be pulled behind a prime mover, including in combination: a tubular steel frame of substantially U-shape with a crotch portion and first and second parallel side portions extending rearwardly from said crotch portion, said crotch portion extending diagonally with respect to said side portions so that the corner it makes with said first side portion lies ahead of the corner it makes with said second side portion, said first side portion extending rearwardly beyond the end of said second side portion; sockets at the rear ends of both said side portions; a tubular steel frame extension piece having a forward end adapted to be connected to either said socket so as to serve as a collinear extension of either said side portion; being connected to said first side portion for use as a side rake and to said second side portion for use as a swath turner; a plurality of bearing blocks secured to said first side portion and to said extension piece to provide generally horizontally extending bearing holes lying along axes parallel to each other and at an acute angle to said first side portion and said extension piece; a crank for each said hole having a shaft rotatably journaled in said bearing hole, an offset pin, and a rearwardly extending web connecting said pin to said shaft; a finger wheel rotatably mounted on each said pin and having peripherally mounted tines; an upwardly extending lever arm secured to each said web; spring means in tension between said arm and a point forward of said block on the frame element supporting that crank so that when said crank rotates in one direction its said finger wheel will move downwardly relative to the frame with consequent increase in spring tension, and when the crank rotates in the other direction its said finger wheel will move upwardly relative to said frame with consequent lessening of spring tension; first ground-engaging means supported by said first side portion near its mid-point; and second ground-engaging means supported by said extension piece adjacent its rear end, each said ground-engaging means comprising a free castor wheel and a resiliently yieldable connection between said wheel and said frame, said first and second ground-engaging means being in line with each other when said extension piece is secured to said first side portion.

2. The rake of claim 1 wherein said bearing blocks are movable along said frame for adjustment of the spacing of said finger wheels.

3. A farming implement to be pulled by a prime mover comprising the combination of: a frame of substantially U-shape with a crotch portion and first and second parallel side portions extending rearwardly from said crotch portion; finger-wheel means carried rotatably by said frame and having peripherally mounted tines; ground-engaging means supported by said frame; a horizontal drawbar adjacent said crotch portion adjacent its mid-point and means for attachment to said prime mover; and a shaft parallel to the line of movement of said prime mover connecting said drawbar to said crotch and enabling relative rotation of said crotch and said drawbar.

4. The rake of claim 3 having means for limiting the extent of said relative rotation.

5. The rake of claim 3 having means for connecting said drawbar to said prime mover so as to provide for relative rotation along the axis of said drawbar.

6. A farming implement to be pulled by a prime mover comprising the combination of: a frame of substantially U-shape with a crotch portion and first and second parallel side portions extending rearwardly from said crotch portion; finger-wheel means carried rotatably by said frame and having peripherally mounted tines; ground-engaging means supported by said frame; means for connecting said crotch portion to said prime mover; means for raising said frame through said connecting means; and means for raising said finger-wheel means relative to said frame when said frame is raised.

7. A side rake or like implement comprising a frame having means enabling connection to a prime mover; a finger wheel adapted to be driven by contact with the crop to displace hay or like material laterally over the ground, a crank having a shaft rotatably supported by the frame, a web, and a pin set at an angle to said shaft, said finger wheel being rotatably mounted on said pin, the axes of said pin and crank intersecting at a point lying to one side of said web.

8. A side rake or like implement comprising a frame having means enabling it to be connected to a tractor or other vehicle for moving the implement over the ground; axle means hinged to said frame; finger-wheel means adapted to be driven by contact with the crop to displace hay or like material laterally over the ground, each said finger-wheel means being rotatably mounted on a said axle means so that the finger-wheel means can move upwardly and downwardly relatively to the frame and so that it rotates in planes lying at angles which vary relatively to the transverse plane of the frame according to the position in elevation assumed by the wheel relatively to the frame.

9. The implement of claim 8 having means for limiting the degree of upward and downward movement of the finger-wheel means relatively to the frame.

10. The implement of claim 8 wherein the limiting means are adjustable.

11. A farming implement to be pulled by a prime mover comprising the combination of: a frame of substantially U-shape with a crotch portion and first and second parallel side portions extending rearwardly from said crotch portion; finger-wheel means rotatably mounted on said first side portion intermediate said side portions and inclined thereto and having peripherally mounted tines; ground-engaging means only partially supporting said frame; and attachment means secured to said crotch portion for attachment to a three-point hydraulic linkage of a prime mover, which then provides the remainder of the support for said frame, said attachment means comprising an assembly mounted on said crotch portion adjacent its midpoint and having a horizontal drawbar with depending trunnion pins thereon at each end for attachment to two of said three points of said hydraulic linkage, a link projecting upwardly from said drawbar and pivotally connected to said crotch portion, and means for connecting said link to the third point of said hydraulic linkage.

12. For use with a farming implement to be pulled by a prime mover and having a frame; finger-wheel means rotatably mounted on said frame; ground-engaging means only partially supporting said frame, the improvement comprising attachment means secured to said frame for attachment to a three-point hydraulic linkage of a prime mover, for providing the remainder of the support for said frame, said attachment means comprising a vertical king-pin locked to said frame and having a depending lug, a horizontal drawbar extending through said lug and having depending trunnion pins thereon at each end for attachment to two of said three points of said hydraulic linkage, a link projecting upwardly from said king-pin and pivotally connected to it for movement in a vertical plane, means limiting the pivotal movement of said link and means for connecting the upper end of said link to the third point of said hydraulic linkage.

13. The rake of claim 12 wherein the trunnion pin on one end of said drawbar lies further from said lug than those on the other end and having means whereby said drawbar can be reversed.

14. The rake of claim 12 wherein the trunnion pins lie below said drawbar and along an axis forward of the axis of said drawbar.

15. The rake of claim 12 having means for controlling from said prime mover the angular position of said king-pin relatively to said frame.

16. The rake of claim 12 wherein said drawbar is slidable in said lug.

17. A farming implement to be pulled by a prime mover comprising the combination of: a frame of substantially U-shape with a crotch portion and first and second parallel side portions extending rearwardly from said crotch portion; finger-wheel means rotatably mounted on said first side portion intermediate said side portions and inclined thereto and having peripherally mounted tines; two ground-engaging wheels only partially supporting said frame; and attachment means secured to said crotch portion for attachment to a three-point hydraulic linkage of a prime mover, which then provides the remainder of the support for said frame, said attachment means comprising a turntable assembly mounted on said crotch portion adjacent its midpoint and having a vertical socket, a king-pin journaled in said socket and having a depending lug, means for locking said king-pin to said socket at any of several rotational positions, a horizontal drawbar extending through said lug and having depending trunnion pins thereon at each end for attachment to two of said three points of said hydraulic linkage, means for locking said king-pin to said socket, a link projecting upwardly from said king-pin and pivotally connected to it, means limiting the pivotal movement of said link, and means for connecting said link to the third point of said hydraulic linkage.

18. For use with a farming implement to be pulled by a prime mover and having a frame of substantially U-shape with a crotch portion and first and second parallel side portions extending rearwardly from said crotch portion; finger-wheel means rotatably mounted on said first side portion intermediate said side portions and inclined thereto and having peripherally mounted tines; two ground-engaging wheels providing two support points for said frame, the improvement comprising attachment and third-point support means secured to said crotch portion for attachment to a three-point hydraulic linkage of a prime mover, comprising a turntable assembly mounted on said crotch adjacent its midpoint and having a vertically extending socket, a vertical king-pin journaled in said socket and having a depending lug, a horizontal drawbar extending through said lug and having depending trunnion pins thereon at each end for attachment to two of said three points of said hydraulic linkage, means for locking said king-pin to said socket at any one of several fixed rotational positions relative to said socket, a link projecting upwardly from said king-pin and pivotally connected to it for movement in a vertical plane, means limiting the pivotal movement of said link, and means for connecting the upper end of said link to the third point of said hydraulic linkage.

19. A side rake including in combination adapted to be driven by contact with the crop or ground, a frame, ground-engaging means connected to the frame for only partly supporting said rake in correct working position relatively to the ground, additional support means for connecting said frame to the rear end of a traction vehicle and thereby maintaining said rake in correct working position relatively to the ground, said support means having means for restraining said frame against lateral movement relatively to the traction vehicle and having means enabling a controlled amount of relatively pitching movement between the traction vehicle and said rake, at least two finger-wheels, and mountings attached to the frame for rotatably supporting said finger-wheels, said mountings extending from the finger-wheels to the frame in a direction away from the direction of movement of said rake when in operation.

20. The rake of claim 19 wherein said support means includes means for enabling said traction vehicle to lift said rake clear of the ground.

21. The rake of claim 19 wherein said support means has a substantilly horizontal hinging axis enabling said rake to rock upwardly and downwardly relatively to said traction vehicle in said pitching movement, and a substantially vertical hinging axis enabling angular adjustment of said rake relatively to the traction vehicle, the two axes lying in planes which are offset from each other.

22. The rake of claim 19 wherein said support means comprises a turntable having parts which are rotatable relatively to each other about a vertical axis and releasable means for locking said parts together.

23. The rake of claim 22 wherein said turntable includes a socket secured to the frame, a king-pin engaged in the socket for rotation about a vertical axis relatively to the socket and adapted for connection to said traction vehicle, and intermeshing toothed gearing for effecting relative rotation between said king-pin and said socket and for holding them against relative rotation.

24. The rake of claim 19 wherein said support means comprise means enabling adjustment of the angular relation of the rake in a horizontal plane relative to the traction vehicle and wherein at least one said ground-engaging means being steerable, and means for automatically steering said ground-engaging means concomitantly with adjustment of the said angular adjustment of said rake.

25. The rake of claim 24 wherein the steering means maintain said finger-wheels at a substantially constant angle of attack on the crop when the rake is connected to said traction vehicle.

26. The rake of claim 25 wherein said steering means are adjustable for pre-setting.

27. The rake of claim 26 having means for rendering said steering means in-operative when said rake is in motion.

28. A farming implement to be pulled by a prime mover and comprising the combination of: a frame; a series of finger wheels having peripherally mounted tines; a plurality of finger-wheel-supporting means individually slidably connected to said frame for rotatably supporting said finger wheels individually and so that they lie in parallel planes; means for individually locking each supporting means to said frame so that relative spacing between successive said finger wheels can be adjusted and maintained; and ground-engaging means at least partly supporting said frame.

29. The implement of claim 28 having means for retaining said finger-wheel-supporting means in a constant rotational position relative to said frame.

30. The implement of claim 28 having a crank for mounting each said finger wheel, said crank having a shaft rotatably mounted on its said frame or extension piece, an offset pin, and a rearwardly extending web connecting said pin to said shaft, said finger wheel being rotatably mounted on said pin.

31. A side rake convertible to a swath cutter and adapted to be pulled behind a prime mover having a three-point hydraulic linkage including in combination: a frame of substantially U-shape with a crotch portion and first and second parallel side portions extending rearwardly from said crotch portion, said crotch portion extending diagonally with respect to said side portions so that the corner it makes with said first side portion lies ahead of the corner it makes with said second side portion, said first side portion extending rearwardly beyond the end of said second side portion; a frame extension piece having a forward end adapted to be connected to either said side portion so as to serve as a collinear extension of either, being connected to said first side portion when the device is used as a side rake and to said second side portion when the device is used as a swath cutter; a series of finger wheels having peripherally mounted tines; a plurality of cranks, one for each said finger wheel, each having a generally horizontal shaft, some shafts being rotatably journaled to said first side portion and some to said extension piece, and extending therefrom at an acute angle, each said crank also having an offset pin, and a rearwardly extending web connecting said pin to said shaft, each said finger wheel being rotatably mounted on a said pin, the axes of the pin and the shaft being so inclined that, if extended beyond said crank they meet at an angle greater than ten degrees; spring means in tension between each said crank and the frame element supporting that crank so that when said crank rotates in one direction its said finger wheel will move downwardly relative to the frame with consequent increase in spring tension, and when the crank rotates in the other direction its said finger wheel will move upwardly relative to said frame with consequent lessening of spring tension; first ground-engaging means supported by said first side portion near its mid-point; second ground-engaging means supported by said extension piece adjacent its rear end, said first and second ground-engaging means being in line with each other when said extension piece is secured to said first side portion.

32. A side rake convertible to a swath cutter and adapted to be pulled behind a prime mover having a three-point hydraulic linkage including in combination: a frame of substantially U-shape with a crotch portion and first and second parallel side portions extending rearwardly from said crotch portion, said crotch portion extending diagonally with respect to said side portions so that the corner it makes with said first side portion lies ahead of the corner it makes with said second side portion, said first side portion extending rearwardly beyond the end of said second side portion; a frame extension piece having a forward end adapted to be connected to either said side portion so as to serve as a collinear extension of either, being connected to said first side portion when the device is used as a side rake and to said second side portion when the device is used as a swath cutter; a series of finger wheels having peripherally mounted tines; a plurality of cranks, one for each said finger wheel, each having a generally horizontal shaft, some shafts being rotatably journaled to said first side portion and some to said extension piece, and extending therefrom at an acute angle, each said crank also having an offset pin, and a rearwardly extending web connecting said pin to said shaft, each said finger wheel being rotatably mounted on a said pin; spring means in tension between each said crank and the frame element supporting that crank so that when said crank rotates in one direction its said finger wheel will move downwardly relative to the frame with consequent increase in spring tension, and when the crank rotates in the other direction its said finger wheel will move upwardly relative to said frame with consequent lessening of spring tension; means for limiting the extent of movement of said crank shaft; first ground-engaging means supported by said first side portion near its mid-point; and second ground-engaging means supported by said extension piece adjacent its rear end, said first and second ground-engaging means being in line with each other when said extension piece is secured to said first side portion.

33. A side rake convertible to a swath cutter and adapted to be pulled behind a prime mover having a three-point hydraulic linkage including in combination: a frame of substantially U-shape with a crotch portion and first and second parallel side portions extending rearwardly from said crotch portion, said crotch portion extending diagonally with respect to said side portions so that the corner it makes with said first side portion lies ahead of the corner it makes with said second side portion, said first side portion extending rearwardly beyond the end of said second side portion; a frame extension piece having a forward end adapted to be connected to either said side portion so as to serve as a collinear extension of either, being connected to said first side portion when the device is used as a side rake and to said second side portion when the device is used as a swath cutter; a series of finger wheels having peripherally mounted tines; a plurality of cranks, one for each said finger wheel, each having a generally horizontal shaft, some shafts being rotatably journaled to said first side portion and some to said extension piece, and extending therefrom at an acute angle, each said crank also having an offset pin, and a rearwardly extending web connecting said pin to said shaft, and having an arm extending up therefrom with a plurality of attachment means, each said finger wheel being rotatably mounted on a said pin; a helical spring in tension between each said crank and the frame element supporting that crank, said spring means being connected at one end to the adjacent frame member forward of said shaft and at the other end to one of said attachment means on the arm of said crank web, so that when said crank rotates in one direction its said finger wheel will move downwardly relative to the frame with consequent increase in spring tension, and when the crank rotates in the other direction its said finger wheel will move upwardly relative to said frame with consequent lessening of spring tension; first ground-engaging means supported by said first side portion near its mid-point; and second ground-engaging means supported by said extension piece adjacent its rear end, said first and second ground-engaging means being in line with each other when said extension piece is secured to said first side portion.

34. A side rake convertible to a swath cutter and adapted to be pulled behind a prime mover having a three-point hydraulic linkage including in combination: a frame of substantially U-shape with a crotch portion and first and second parallel side portions extending rearwardly from said crotch portion, said crotch portion extending diagonally with respect to said side portions so that the corner it makes with said first side portion lies ahead of the corner it makes with said second side portion, said first side portion extending rearwardly beyond to the end of said second side portion; a frame extension piece having a forward end adapted to be connected to either said side portion so as to serve as a collinear extension of either, being connected to said first side portion when the device is used as a side rake and to said second side portion when the device is used as a swath cutter; a series of finger wheels having peripherally mounted tines; a plurality of cranks, one for each said finger wheel, each having a generally horizontal shaft with an extension, some shafts being rotatably journaled to said first side portion and some to said extension piece, and extending therefrom at an acute angle, each said crank also having an offset pin, and a rearwardly extending web connecting said pin to said shaft, each said finger wheel being rotatably mounted on a said pin; a tension spring in tension between the extension on the shaft of each said crank and the frame element supporting that crank so that when said crank rotates in one direction its said finger wheel will move downwardly relative to the frame with consequent increase in spring tension, and when the crank rotates in the other direction its said finger wheel will move upwardly relative to said frame with consequent lessening of spring tension; first ground-engaging means supported by said first side portion near its mid-point; and second ground-engaging means supported by said extension piece adjacent its rear end, said first and second ground-engaging means being in line with each other when said extension piece is secured to said first side portion.

35. A turntable assembly for connecting a farming implement to a three-point hydraulic linkage on a prime mover comprising: a socket having a vertical bearing hole and a pair of horizontal flanges diametrically opposite each other with a series of vertical holes therethrough; a king-pin journaled in said socket and having a depending lug and a pair of ears projecting out above said flanges and means for locking either ear to a said flange at any said vertical hole; a horizontal drawbar extending through said lug and having depending trunnion pins thereon at each end for attachment to two of said three points of said hydraulic linkage; a box-like link projecting upwardly from said king-pin and pivotally connected to it; means limiting the pivotal movement of said link; and means for connecting said link to the third point of said hydraulic linkage, whereby said hydraulic linkage can lift said implement through said assembly and whereby the connection between said ears and said flanges enables adjustment of the trailing position of said implement relative to said prime mover.

References Cited in the file of this patent
UNITED STATES PATENTS

| | | |
|---|---|---|
| 2,447,354 | Morrill | Aug. 17, 1948 |
| 2,689,446 | Sorrels | Sept. 21, 1954 |
| 2,722,799 | Cooley | Nov. 8, 1955 |
| 2,811,009 | Plant | Oct. 29, 1957 |
| 2,837,888 | Van der Lely et al. | June 10, 1958 |
| 2,862,348 | Van der Lely et al. | Dec. 2, 1958 |
| 2,904,950 | Van der Lely et al. | Sept. 22, 1959 |
| 2,923,118 | Van der Lely et al. | Feb. 2, 1960 |
| 2,925,700 | Plant | Feb. 23, 1960 |
| 2,947,135 | Van der Lely et al. | Aug. 2, 1960 |
| 2,953,892 | Van der Lely et al. | Sept. 27, 960 |
| 2,955,407 | Van der Lely et al. | Oct. 11, 1960 |
| 2,968,142 | Van der Lely et al. | Jan. 17, 1961 |
| 2,988,865 | Van der Lely | June 20, 1961 |

FOREIGN PATENTS

| | | |
|---|---|---|
| 512,929 | Belgium | Aug. 14, 1952 |
| 540,218 | Belgium | Oct. 13, 1955 |
| 548,264 | Italy | Sept. 20, 1956 |
| 1,139,762 | France | Feb. 18, 1957 |

UNITED STATES PATENT OFFICE
CERTIFICATE OF CORRECTION

Patent No. 3,110,149  November 12, 1963

Robin S. Bisley

It is hereby certified that error appears in the above numbered patent requiring correction and that the said Letters Patent should read as corrected below.

Column 6, line 50, for "diamertically" read -- diametrically --; column 7, line 54, for "pin" read -- pins --; column 9, line 42, for "or", first occurrence, read -- a --; column 12, line 18, before "positioned" insert -- so --; column 16, line 51, for "projects" read -- project --; column 24, line 36, for "substantilly" read -- substantially --; column 26, line 65, for "chotch" read -- crotch --.

Signed and sealed this 26th day of May 1964.

(SEAL)
Attest:

ERNEST W. SWIDER
Attesting Officer

EDWARD J. BRENNER
Commissioner of Patents